US006493872B1

(12) United States Patent
Rangan et al.

(10) Patent No.: US 6,493,872 B1
(45) Date of Patent: Dec. 10, 2002

(54) METHOD AND APPARATUS FOR SYNCHRONOUS PRESENTATION OF VIDEO AND AUDIO TRANSMISSIONS AND THEIR INTERACTIVE ENHANCEMENT STREAMS FOR TV AND INTERNET ENVIRONMENTS

(75) Inventors: P. Venkat Rangan, San Diego, CA (US); Mehul Shah, Del Mar, CA (US); Vijnan Shastri, San Diego, CA (US); Indranil Chakraborty, Del Mar, CA (US)

(73) Assignee: Innovatv, San Diego, CA (US)

( * ) Notice: Subject to any disclaimer, the term of this patent is extended or adjusted under 35 U.S.C. 154(b) by 0 days.

(21) Appl. No.: 09/168,315

(22) Filed: Oct. 7, 1998

Related U.S. Application Data

(63) Continuation-in-part of application No. 09/160,365, filed on Sep. 24, 1998, which is a continuation-in-part of application No. 09/154,532, filed on Sep. 16, 1998.

(51) Int. Cl.[7] .............................. H04J 3/06; H04N 7/173
(52) U.S. Cl. ......................... 725/32; 725/109; 370/503; 370/509; 348/563; 348/584
(58) Field of Search .................................. 345/327, 328; 348/6, 7, 10, 13, 12, 512, 513, 510, 518, 519, 478, 479; 370/509, 503, 506, 536–539; 725/48, 49, 109, 110, 51, 32, 40, 41, 42, 43; H04N 5/04, 9/44, 4/175, 7/00, 7/082; H04J 3/06

(56) References Cited

U.S. PATENT DOCUMENTS 5,333,299 A * 7/1994 Koval et al. ................ 395/550
5,341,405 A * 8/1994 Mallard, Jr. ................ 375/120
5,392,318 A * 2/1995 Ellis et al. .................. 375/118
5,737,371 A * 4/1998 Jaquette ...................... 375/357
5,793,756 A * 8/1998 Ayerst et al. ................ 370/211
5,966,120 A * 10/1999 Arazi et al. ................. 345/327
5,966,387 A * 10/1999 Cloutier ...................... 370/516
6,078,725 A * 6/2000 Tanaka ........................ 386/100
6,081,299 A * 6/2000 Kesselring .................. 348/512
6,173,317 B1 * 1/2001 Chaddha et al. ............ 709/217

* cited by examiner

Primary Examiner—Andrew Faile
Assistant Examiner—Vivek Srivastava
(74) Attorney, Agent, or Firm—Donald R. Boys; Central Coast Patent Agency, Inc.

(57) ABSTRACT

A system for synchronizing data streams meant to be displayed concurrently at an end station, but delivered by separate delivery networks is disclosed. In one aspect, apparatus and methods for marking one of the data streams relative to the other are taught, including insertion of frame numbers in vertical and horizontal blanking intervals, the numbers referring to frames in the other stream and related to timing markers, and inserting such numbers by pixel data alteration. In another aspect, apparatus and methods are taught for receiving and re-synchronizing the data streams at a delivery point, including decoding of the relationship data inserted in one data stream referring to the other data stream. Re-synchronization is accomplished by controlling the separate data streams in separate buffer pipelines by a single controller. In a preferred embodiment one data stream is a live video data stream and the other is an annotation stream having added material to be displayed with the live video data stream.

12 Claims, 13 Drawing Sheets

METHOD AND APPARATUS FOR SYNCHRONOUS PRESENTATION OF VIDEO AND AUDIO TRANSMISSIONS AND THEIR INTERACTIVE ENHANCEMENT STREAMS FOR TV AND INTERNET ENVIRONMENTS

CROSS-REFERENCE TO RELATED DOCUMENTS

The present invention is a continuation-in-part (CIP) of copending patent application entitled Multi-Authoring Station System and Methods for Tracking and Adding Multiple Hyperlinked Graphics and Annotations Within a Live or Archived Video Broadcast, Ser. No. 09/160,365, filed Sep. 24, 1998, which is a CIP of copending patent application entitled Enhanced Interactive Video with Object Tracking and Hyperlinking, Ser. No. 09/154,532, filed Sep. 16, 1998. The above described copending applications are incorporated herein in their entirety by reference.

FIELD OF THE INVENTION

The present invention is in the field of video broadcasting and editing and pertains more particularly to methods and apparatus for receiving separate video and video enhancement data-streams from different sources and combining them to be displayed synchronously.

BACKGROUND OF THE INVENTION

With continuing development of new and better ways of delivering television and other video presentations to end users, and parallel development of computerized information systems, such as the Internet and the associated World Wide Web (WWW), there have been concerted efforts to integrate various systems to provide enhanced information delivery and entertainment systems. For example, developers are introducing integrated systems combining TVs with computer subsystems, so a TV may be used as a WEB browser, or a PC may be used for enhanced TV viewing.

In some systems computer elements, such as a CPU, memory, and the like, are built into the familiar chassis of a TV set. In such a system, the TV screen becomes the display monitor in the computer mode. In such a system, conventional TV elements and circuitry are incorporated along with the computer elements, and capability is provided for a user to switch modes, or to view recorded or broadcast video with added computer interaction. One may thus, with a properly equipped system, select to view analog TV programs, digital TV programs, conventional cable TV, satellite TV, pay TV from various sources, and browse the WWW as well, displaying WEB pages and interacting with on-screen fields and relational systems for jumping to related information, databases, and other WEB pages. The capabilities are often integrated into a single display, that is, one may view a broadcast presentation and also have a window on the display for WEB interaction.

In some other systems, computer elements are provided in an enclosure separate from the TV, often referred to in the art as a set-top box. Set-top box systems have an advantage for providers in that they may be connected to conventional television sets, so end users don't have to buy a new TV along with the computer elements.

In such integrated systems, whether in a single enclosure or as set-top box systems, user input is typically through a hand-held device quite similar to a familiar remote controller, usually having infra-red communication with the set-top box or a receiver in the integrated TV. For computer modes, such as WEB browsing, a cursor is displayed on the TV screen, and cursor manipulation is provided by buttons or other familiar pointer apparatus on the remote. Select buttons are also provided in the remote to perform the familiar function of such buttons on a pointer device, like a mouse or trackball more familiar to computer users.

Set-top boxes and computer-integrated TVs adapted as described above typically have inputs for such as a TV antenna (analog), cable TV (analog or digital), more recently direct-satellite TV (digital), and may also connect to video cassette recorders and to mass storage devices such as hard disk drives and CD-ROM drives to provide a capability for uploading video data from such devices and presenting the dynamic result as a display on the TV screen.

The present inventors have noted that with the coupling of computer technology with TV, many capabilities familiar to computer users have been made available to TV users. For example, ability to provide text annotation for TV presentations is considerably enhanced. Computer techniques such as a Pix-on-Pix are now available, wherein separate TV presentations may be made in separate windows, or overlaid windows on the display screen. Separate windows may also support display from separate sources, such as an analog TV program in one window, a computer game in another, and a video conference in a third.

With the technologies described above becoming more available in the market place, it has become desirable to further integrate the technologies described so that a user viewing a video presentation might be enabled to gather additional information about a specific image entity or entities portrayed in a video through interactive method. An ultimate goal is to provide a means for advertisers to promote and sell products through user interaction in a way that minimizes steps required by such a user to access additional information regarding traditionally advertised products such as through commercials and the like.

In typical prior art video authoring systems, end users receive a single video stream that contains the video data and any added annotated data such as subtitling, sponsor logos, information blocks, and the like. However, it is desirable to build upon the goal stated in the preceding paragraph above, by having separate streams, one containing video data, and the other containing annotative data, that may arrive at and end user's location via different delivery media and be displayed synchronously on a suitable display screen.

Although the inventor knows of an authoring system that may deliver separate streams via separate media, as described above with respect to co-pending patent applications listed under the Cross-Reference to Related Documents section and provided herein as reference, a problem exists with respect to the unpredictable nature of latency conditions inherent to separate media networks that may be chosen to deliver such data streams.

A typical broadcast system may experience a variable latency rate in the broadcast of a video stream of up to several hundred milliseconds. This latency, defined as a variable delay period of signal transmission from the point of broadcast to the end point (end user), is experienced at the users end. Quality of lines, connections, and other interferences may affect such latency conditions.

Internet delivery systems which transmit data using switched-packet-technology also experience unpredictable latency problems, similar to that described above, as well as competition from a host of other data transfer events due to the fact that, generally speaking, bandwidth must be shared. While measures may be taken at the user's end to improve downloading capabilities such as employing a better modem or using an integrated services digital network (ISDN) connection, unpredictable latency is still a problem.

Because the latency factor regarding such delivery or broadcast methods cannot be reliably predicted, the prospect of sending separate data or video streams over different networks and then re-synchronizing them to be displayed as one stream on a user's display system is a formidable challenge.

What is clearly needed is a method and apparatus that would allow a user receiving two separate data-streams via separate and unrelated delivery systems to re-synchronize and combine the streams into one stream, containing both the video data and the annotation data, for the purpose of displaying the combined and synchronous stream on a suitable display monitor for viewing. Such a method and apparatus would also allow product advertisers more option with regards to personalizing advertisements for target end users.

SUMMARY OF THE INVENTION

In a preferred embodiment of the present invention a system for marking a first data stream relative to a second data stream is provided, the two streams synchronized, comprising a pipeline having an input for each data stream; a reader noting selected data in the pipeline from the second data stream; and a writer writing the selected data to the first data stream in the pipeline.

In a preferred embodiment the selected data comprises numbers identifying frames in the second data stream, and there may also be timing markers placed by the writer in the first data stream. Typically the first data stream is a live video data stream and the second data stream is an annotation data stream authored in synchronization with the first data stream. The annotation data stream may include tracking data derived from tracking an entity in the first data stream.

In some cases the numbers identifying frames in the second data stream are written into vertical blanking intervals (VBI) in the first data stream. In other instances the numbers identifying frames in the second data stream are written into horizontal blanking intervals (HBI) in data for individual frames in the first data stream. In still other instances the numbers identifying frames in the second data stream are coded into the first data stream by altering pixel data for at least one pre-selected pixel in one or more frames, and wherein the numbers identifying frames are associated with timing marks in the first data stream.

Timing marks in some cases are at intervals of a number of frames by convention. In others the timing marks are binary numbers inserted into the first data stream by the writer. The timing marks are, in some cases by convention, scene changes in the first data stream.

In another aspect of the invention a method for marking a first data stream relative to a second data stream, while the streams are in synchronization, for later synchronizing the two data streams when out of synchronization is taught, comprising steps of (a) entering the two data streams in a pipeline; (b) noting selected data in the pipeline from the second data stream; and (c) writing the selected data to the first data stream in the pipeline. In step (b), the selected data may comprise code identifying color pixels in the video data stream, or numbers identifying frames.

In some embodiments the first data stream is a live video data stream and the second data stream is an annotation data stream authored in synchronization with the first data stream. The annotation data stream may include tracking data derived from tracking an entity in the first data stream.

In another aspect of the invention a system for synchronizing a first data stream with a second data stream is provided, comprising a first controllable dynamic buffer reading the first data stream for inserted frame identifiers identifying frames from the second data stream to be displayed with frames from the first data stream to accomplish synchronization; a second controllable dynamic buffer reading frame identifiers in the second data stream; and a control module controlling the dynamic buffers, adjusting the relative position of the two dynamic streams to accomplish synchronization according to the data read from the two data streams.

In a preferred embodiment the frame identifiers read from the first data stream identifying frames from the second data stream are binary numbers read from vertical blanking intervals (VBI) in the first data stream. In an alternative embodiment the frame identifiers read from the first data stream identifying frames from the second data stream are binary numbers read from horizontal blanking intervals (HBI) in the first data stream. In yet another embodiment the frame identifiers read from the first data stream identifying frames from the second data stream are binary numbers decoded from pixel data in one or more frames in the first data stream.

In some embodiments timing markers associated with the frame data are read from the first data stream, and the control module utilizes the timing markers in adjusting the relative positions of the data streams. Relative positioning of the data streams is accomplished by delaying one or the other of the data streams, such as by repeating frames in the stream to be delayed. Preferably adjustment is made gradually toward synchronization each time an adjustment is made.

In another aspect a method for synchronizing a first data stream with a second data stream is provided, comprising steps of (a) reading the first data stream in a first controllable dynamic buffer for inserted frame identifiers identifying frames from the second data stream to be displayed with frames from the first data stream to accomplish synchronization; (b) reading frame identifiers from the second data stream in a second controllable dynamic buffer; and (c) controlling the dynamic buffers by a control module, adjusting the relative position of the two dynamic streams to accomplish synchronization according to the data read from the two data streams.

In this method, in step (a), the frame identifiers read from the first data stream identifying frames from the second data stream may be binary numbers read from vertical blanking intervals (VBI) in the first data stream. In another embodiment the frame identifiers read from the first data stream identifying frames from the second data stream may be binary numbers read from horizontal blanking intervals (HBI) in the first data stream. In yet another embodiment the frame identifiers read from the first data stream identifying frames from the second data stream may be binary numbers decoded from pixel data in one or more frames in the first data stream. Further, timing markers associated with the frame data may be read from the first data stream, and the control module may utilize the timing markers in adjusting the relative positions of the data streams.

In the various aspects of the invention, taught in enabling detail below, for the first time apparatus and methods are provided allowing data streams to be marked while operated in synchronization, and to then be delivered by different networks having different latency effects, such that the streams are not synchronous as received, but may be re-synchronized using the marks provided while the streams were synchronous.

BRIEF DESCRIPTION OF THE DRAWING FIGURES

DESCRIPTION OF THE PREFERRED EMBODIMENTS

Figure 1:
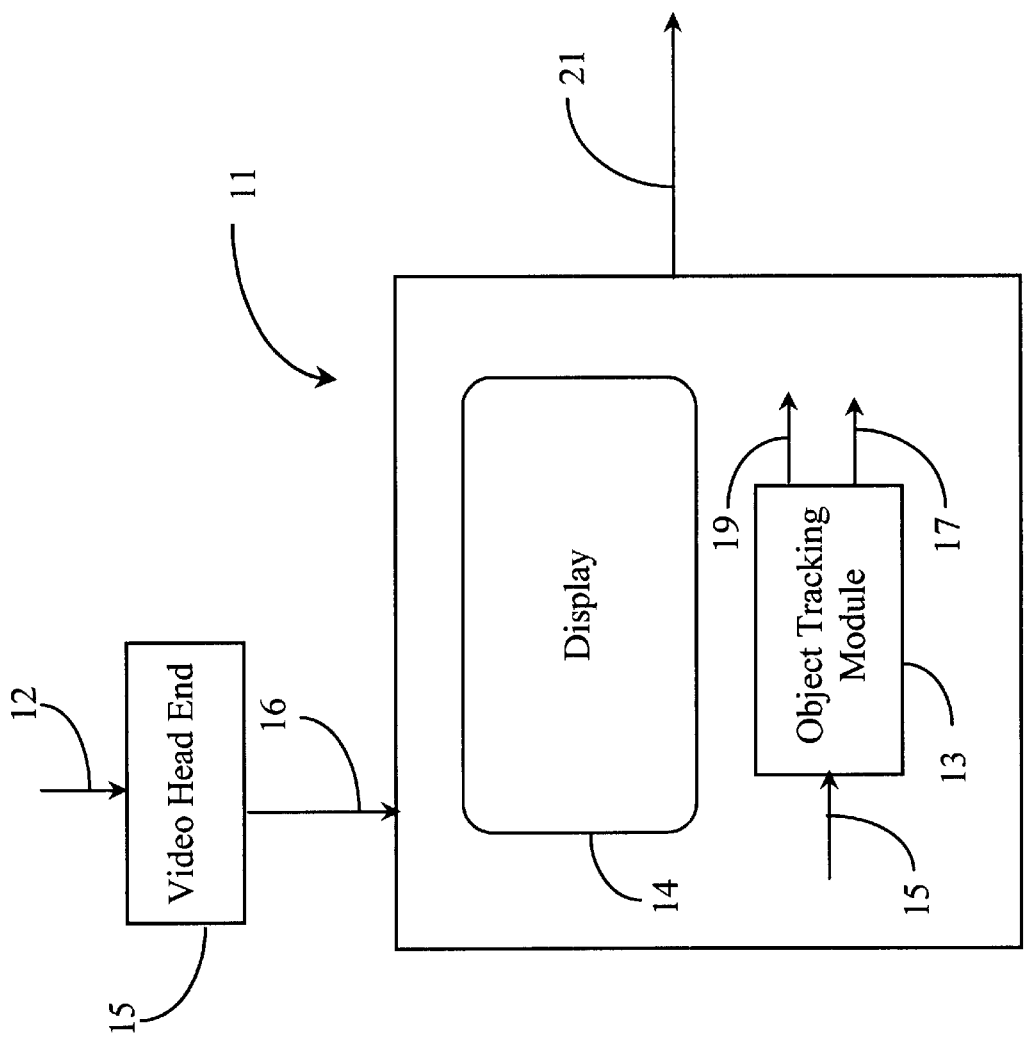
FIG. 1 is a block diagram illustrating an authoring system incorporating an image tracking module according to an embodiment of the present invention.

According to a preferred embodiment of the present invention, a method and apparatus is provided which allows a programmer functioning in a video editing mode to initiate tracking of any image entity or entities in a video stream, after which initiation tracking may be automatic, wherein appropriate coordinate-tracking data associated with the image entity or entities is provided synchronized with the original data stream so that such entities may later be rendered identifiable and interaction-capable to an end user. By image entity is meant any person or thing depicted in a video display, such as a player in a sports game, and actor in a play, a car in a car race, and so on FIG. 1 is a block diagram illustrating an authoring station 11 adapted for accepting a video data stream 16 from a video head end 15 as is known in the art. The original video data source 12 may be any recorded or live source and is not limited as to protocol. Authoring station 11 includes a display 14 and an object tracking module 13 which is adapted to automatically track image entities in a video presentation, and to synchronize the tracking result with the video data stream.

The overall purpose of the authoring station is addition of innovative material to the video data stream, such as text overlay, graphic icons and logos for advertisement, some of which may be associated with identity and address data to allow a viewer at a computerized end station to access advertisements and other data which may be associated with individual entities in the video presentation. Advertisements may, for example, be associated with a tracked object. Also the text annotations could either be set to track along with an object, or appear in a fixed position anywhere on the screen, as they are typical in broadcasts today.

In FIG. 1 input data stream 15 to tracking module 13 is a stream of successive bitmapped frames in a normalized resolution, required by the tracking module. The authoring station can be based on virtually any sort of computer platform and operating system, and in a preferred embodiment, a PC station running MS Windows is used, in which case the input stream 16, regardless of protocol, is converted to bitmapped frames displayed typically at 30 frames per second with a resolution of 352 by 240 pixels.

The use and operation of the tracking module is disclosed below in enabling detail, and outputs both the original data stream 19 and an annotation stream, which in this case comprises the data of one or more tracks for moving entities in the video display. These two streams may be combined or separately provided to downstream processes and equipment, and other annotations and alterations may be made to the data stream in the authoring station, as described above. Output 21 from authoring station 11 is meant to be a general indication of data output, and not to indicate that there is a single data stream. There may be multiple streams of various protocol.

An authoring station such as station 11 comprises software that may process various media (analog or digital) including video presentations or streams, both live and recorded. For example, included video stream types including but not limited to common formats such as Audio Video Interleave (AVI) and Moving Pictures Experts Group (MPEG). Video source 12 may embody any video source that may be known in the art such as a CD-ROM, Satellite TV, cable TV, VCR, Internet Server, and so on. Video source 12 may provide prerecorded video or live broadcast video. Also, future new formats of video streams shall be considered equivalent in the sense of this invention.

As described briefly above, the inventor has found that a suitable computer platform for performing the tracking process enabled by tracking module 13 is a PC/VDU running Windows with a central processing unit (CPU) operating at least 300 megahertz and having at least 64 megabytes of random access memory (RAM). Video frequency or a frame speed of 30 frames per second (FPS) is utilized in this example as a suitable and compatible standard for processing. The display size of the video picture in this instance is 352×240 pixels, which is a reduced resolution from that normally displayed in a video presentation on most end use stations, but provides a suitable format for the present tracking process. It will, however, be apparent to the skilled artisan that the example parameters presented herein are not limiting to the success of practicing the present invention. Other video frame speeds, video display sizes, computer platform types and speeds, and software types may be employed in other embodiments of the present invention. The only requirement is that the processor be powerful enough to enable the tracking process at the necessary frame speed.

Tracking module 13 is a software module provided as a component of a Windows driver in this particular embodiment. In other embodiments, module 13 may be provided as a driver or as a component of a driver for another platform such as may be used as an alternative to Windows™. Module 13 interfaces with other software components executing on station 11 for the purpose of adding the functionality of the present invention which is the ability to track a moving image entity within a presented video stream.

Tracking module 13 is adapted to determine a pixel signature associated with a visual entity to be tracked in a video display, and then to determine the path of the pixel signature in the display as the path of the image entity to be tracked.

Once the video stream is in the domain of tracking module 13, an image entity in a fist bitmap image is selected to be tracked, and further frame-by-frame movement of the image entity is automatically tracked. Tracking data associated with a tracked image entity is associated with the bitmap video stream via a second synchronous data-stream comprising the frame-by-frame coordinates of the tracked image entity. This output video stream comprises the original stream plus the synchronous data stream that contains the tracking data and is illustrated (via directional arrow) as leaving module.

The end result of tracking process of the present invention is a series of coordinates of an assumed center point of a tracking object associated with the image entity selected to be tracked. Through additional editing processes a moving region associated with the image entity in a display may be made to be interactive and identifiable to an end user. User interaction with such an image entity during viewing of a video can be programmed to provide additional network-stored information about that entity to suitable customer premises equipment (CPE) adapted to receive and display the information. Such further information may be displayed, for example, as an overlay on the display of the dynamic video containing the subject image entity. In this way, advertisers, product promoters, or the like may present information to end users based on user interaction with an associated entity in a dynamic video display.

Figure 2:
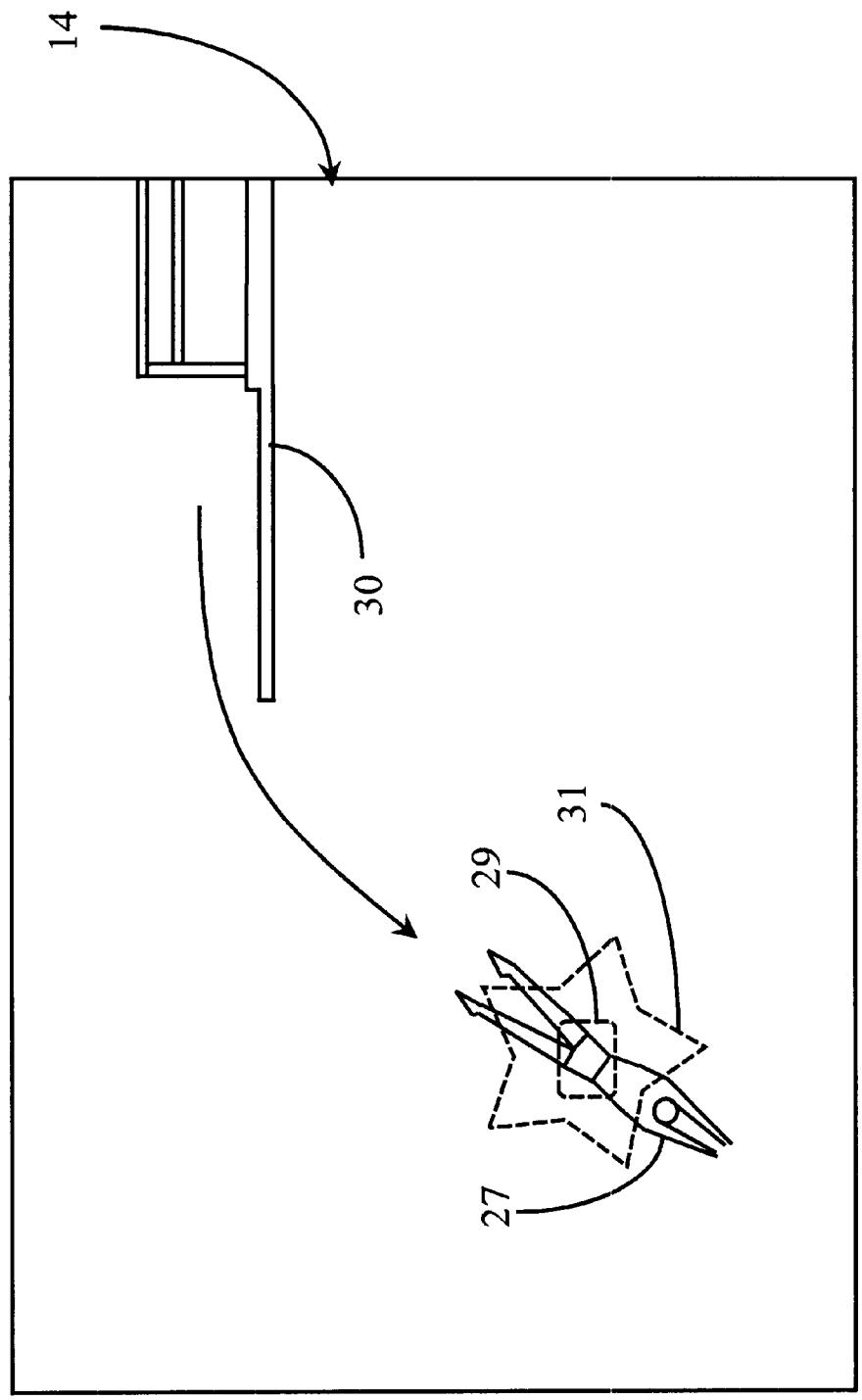
FIG. 2 is an illustration of a display screen depicting a tracked image entity according to an embodiment of the present invention.

FIG. 2 is an illustration of a display screen depicting an image entity 27 to be tracked according to an embodiment of the present invention. PC/VDU display 14 shows a bitmap image stream during the tracking process. Screen 14 is a display screen as viewed by a programmer or editor performing the tracking process.

To begin, an editor selects, typically by well-known cursor technique, a tracking box 29 of pre-selected shape and size, and places (drag-and-drop, click-on etc.) the selected box over an image entity to be tracked, with the center point of the box substantially centered on the image entity to be tracked or at least on a portion of the entity. In a preferred embodiment the editor will have a varied repertoire of sizes and shapes of tracking boxes from which to select, which may be displayed in such as a menu bar, as is well-known in the art. In this example, the editor wishes to track a diver 27 from a diving board 30 and into the water below the diving board. The image entity selected for tracking, however, is not the diver per se, but the swim suit worn by the diver, for reasons which will become more clear in the descriptions below. It is logical to assume that tracking, in this embodiment, commenced as diver 27 begins his dive.

A semi-transparent shape 31 defines an area that may be rendered an interactive area linked to the swim suit of diver 27 as might be seen by an end user watching the video. Typically, shape 31 which is in this case the shape of a star, will not be present or seen in screen 14 during the tracking process, but is illustrated here solely for the purpose of discussion, in that through later video editing processes such shapes may be added to an image stream based on the provided information (frame by frame tracking coordinates of the swim suit).

As previously described, as an initiating event, tracking box 29 is placed over an image entity to be tracked, in this case the swim suit and the tracking process is activated via a mouse click or other command action such as may be executed via keyboard input. Upon tracking box 29 being activated the tracking module creates a table or list comprising pixel values associated with a target number and spatial arrangement of pixels (not shown in FIG. 2) associated with tracking box 29. These target pixels are determined in a preferred embodiment by a random algorithm which is shaded to provide a higher density at and around the centerpoint of the tacking box. The color values for the target pixels are taken from the Video Graphics memory array of the authoring station being used to display the video stream. Specifically, the color (e.g. RGB) values of each target pixel are used as a base comparison signature for tracking box 29 during frame by frame motion (internal frame rate).

Activation of tracking box 29 invokes object tracking module 13 of FIG. 1 and it's subsequent functions. Further detail regarding the unique use of target pixels is described below.

Figure 3:
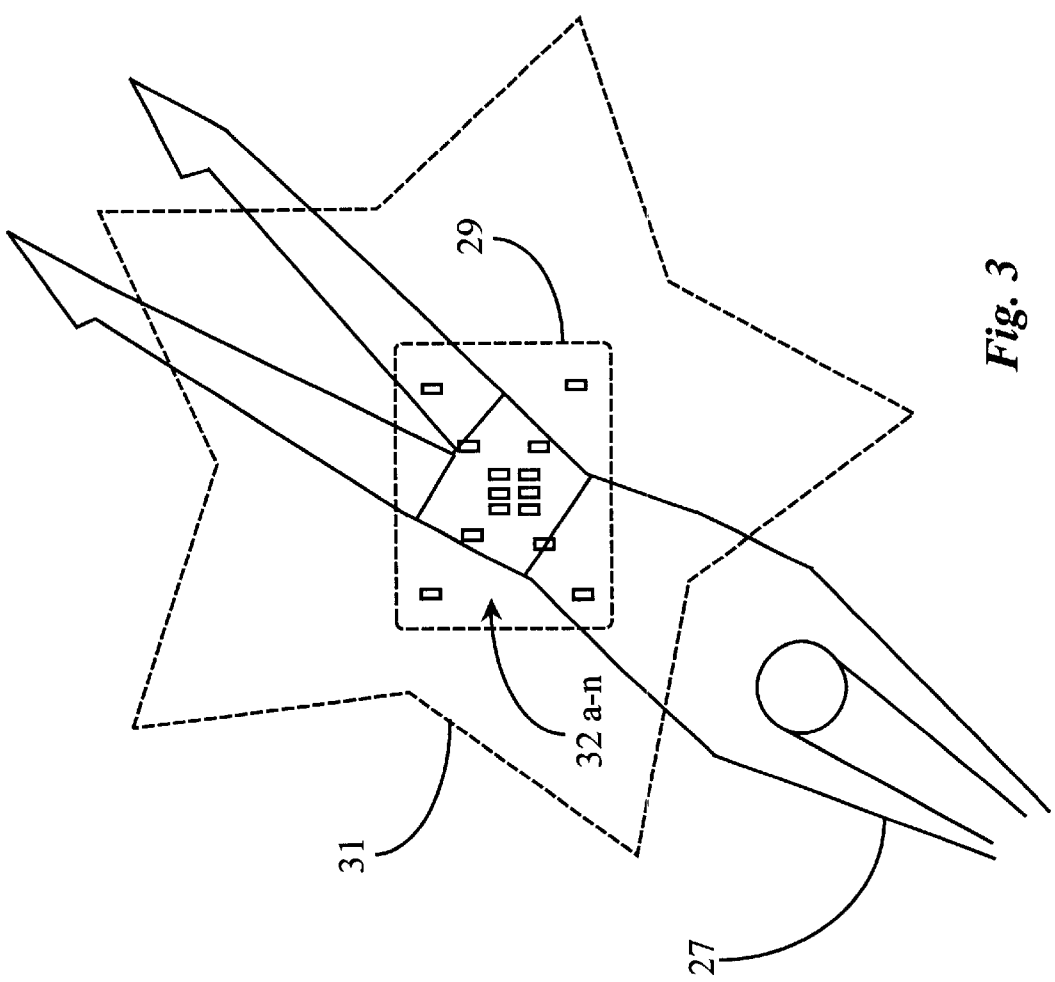
FIG. 3 is an enlarged view of the image entity of FIG. 2 wherein key pixels are visible.

FIG. 3 is an enlarged view of the image entity of FIG. 2 wherein key pixels are shown within the selected tracking box. Tracking box 29 may be any size or shape desired for fitting over an entity selected to be tracked, however a predefined number of target pixels, represented via elements 32a–n, remains substantially constant regardless of size and shape of the tracking box selected. The reason, in this embodiment, for a relatively constant number of pixels is that the process requires an iterative calculation process wherein the values for each signature pixel are involved in calculation at least once for each succeeding frame of the video while the tracking process is running. Since the computing power of the tracking stations remains constant, it is desirable to use a relatively large number of signature pixels (more definitive signature) but not to exceed the computing power of the station.

Although the number of pixels shown in FIG. 3 as signature pixels for exemplary purposes is rather small, and the spacing is indicated as rather regular, there will in reality be a rather larger number of signature pixels associated with a tracking box. In development of working models of the tracking module the number of pixels usable with a high-end PC is from 300 to one thousand. This number, of course, may vary in various embodiments of the tracking module according to the present invention. It has also been determined that a default arrangement of signature pixels with a higher density toward the center of the tracking box is desirable. With the number of pixels constant, or relatively so, from one tracking box to another, the density will vary according to the a real extent of the tracking box selected.

In a preferred embodiment, as briefly mentioned above, the spatial arrangement of the target pixels is randomly generated with a higher density toward the center of the tracking box. The randomization may occur before or after a box is selected. In some cases, an editor may select a shape and resize the box before or in the process of placing the box over an entity to be tracked. In such cases the distribution of target pixels may change as the box is resized, and so on. In other embodiments default target pixel formats may be used, and these may be random or regular, depending on several factors.

In this example, tracking box 29 is of the shape of a rectangle having somewhat rounded corners. The center point of tracking box 29 is preferably placed near an apparent center or median point the entity to be tracked. Thus, signature pixels 32*a*–*n* are concentrated on the swim suit of the diver to be tracked.

When tracking box 29 is positioned and activated over an image entity to be tracked, in this case the diver's swim suit, a signature table is created and stored as described above. The spatial arrangement of the signature pixels is a known default pattern within the tracking box. Therefore, when the center of the tracking box in a frame is decided (box placed and initiation signaled) the coordinates of the signature pixels relative to the bit mapped frame are easily calculated. Each signature pixel then has a known value for R, G and B from the video memory array for the frame displayed. This base signature is captured for tracking purposes. These values are entered into a base table as described further below.

Figure 4:
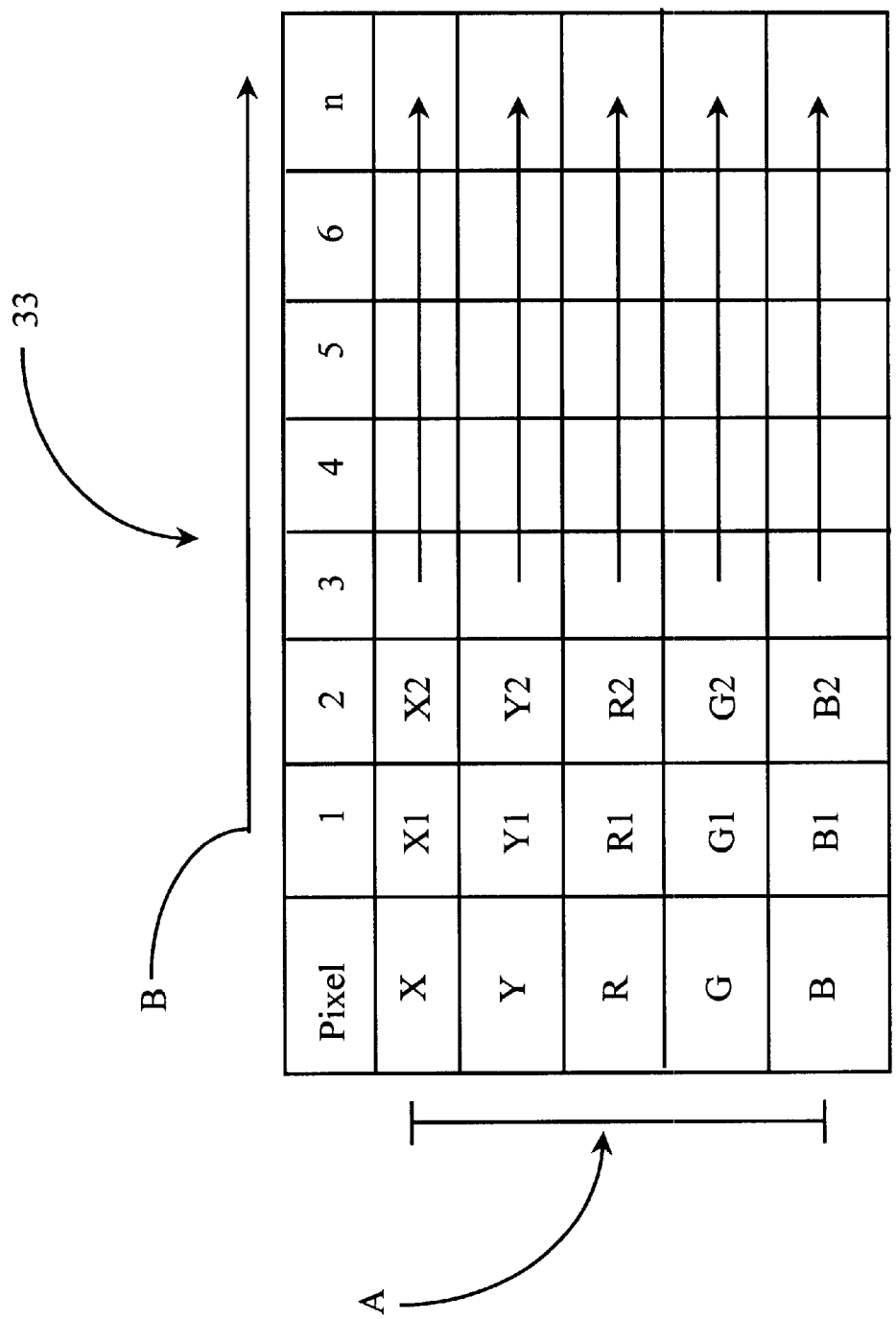
FIG. 4 is a exemplary view of a value table containing values of signature pixels according to an embodiment of the present invention.

FIG. 4 is an exemplary view of a base value table containing values of signature pixels according to an embodiment of the present invention. Value table 33 is created during the initial activation of an image tracking process as described above. Value table 33 contains 5 values per target pixel. A bracketed line A illustrates those 5 values as listed from top to bottom in the first vertical column under Pixel. They are, in order of presentation, X (coordinate), Y(coordinate), R value, G value, and B value. Cartesian coordinates have been assumed for exemplary purposes, but spherical coordinates, or any other coordinate system may also be used.

Each individual pixel is illustrated serially to the right in table 33 as shown by arrow B with the previously described pixel values presented in vertical columns below. For example, pixel 1 shows values X1, Y1, R1, G1, and B1 in a vertical column below. The next column to the right contains pixel 2 and associated values are identically presented. The numbering scheme, of course may any desirable and workable scheme, as the order of calculation is not fundamental to the invention. The representation of value table 33 as illustrated herein is meant only to be an example of a table for storing values. The values being collected and stored may be kept in any logical order such as in a data list or the like.

Once table 33 is created, in the presently described embodiment it remains the signature table for the specific entity being tracked. For example, using the swim suit, table 33 would reflect the x and y coordinates and the RGB values of the signature pixels within and around the suit at the moment the tracking box is activated.

After table 33 is created and stored, which occurs during the time of a single frame at 30 frames per second in this example, a second frame enters the pipeline of the tracking engine. The pipeline is typically 10 frames, but may be more or fewer frames in other embodiments. In the second frame, or the frame following the frame in which the tracking process is initiated and the signature table is created, it must be assumed that the image entity to be tracked has moved. Since there is no way at this point to know the magnitude and direction (vector) of movement, an image testing process is performed to locate the best match for the image signature.

Typically, in a single frame, an entity, unless moving uncommonly rapidly, will not have moved far. A pattern of assumed center points in an expanding spiral around the original center point of the tracking box is therefore assumed and the test pixel pattern at each assumed center point is taken and compared to the stored base signature. The best match to the stored signature is taken to be the new position of the image entity to be tracked, and the center point for the tracking box is recorded. This spiral testing method is performed at each assumed new image position as is further described below.

Figure 5:
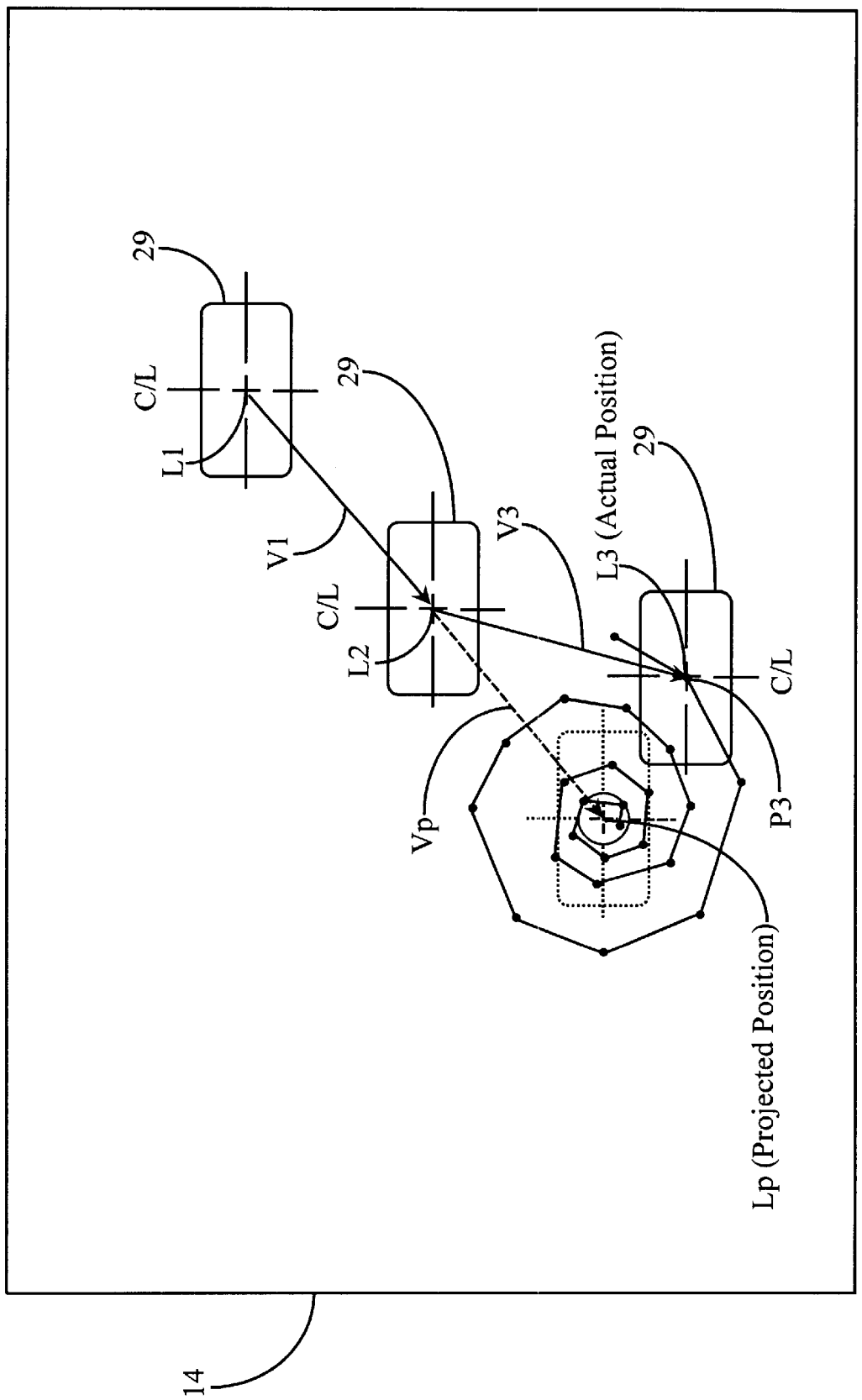
FIG. 5 is a motion diagram illustrating an image tracking process according to an embodiment of the present invention.

FIG. 5 is a motion diagram illustrating an image tracking process according to an embodiment of the present invention. Screen 14 shows a first position L1 of the center point of tracking box 29. This introductory position is the beginning of the tracking process as previously described. L1 has the x and y coordinates of the center point of tracking box 29 at the instant it is placed over an image entity and activated. The image entity itself is not illustrated here for the purpose of simplifying explanation, however, it may be assumed to be present.

In the first iteration the center point tracking box 29 is moved from L1 to L2, shown by vector V1. This first vector is determined by the spiral test pattern as briefly described above, more fully described below. Once this first vector is determined, an assumption is made that a moving entity will typically continue moving in at least nearly the same direction, and at about the same velocity. Therefore, to determine a next assumed position, vector V1 is applied from L2 to determine projected position Lp. At the newly assumed position for the third frame, the spiral pattern test is performed again, and again the best signature match is taken as the correct position for the center point of tracking box 29. The assumed position for the third frame, Lp is now moved to P3, which is found to be the best signature match to the originally stored image signature. At P3 new vector V3 is determined, and V3 is used for the next frame projection.

The process is thus continued from frame to frame, using the last vector as a tool to provide an assumed next position, and then testing that position for accuracy.

In the spiral pattern test, with respect to position Lp, a pattern of 24 points (connected by line segments for illustrative purposes) are illustrated as forming an outward spiral in a counter-clockwise direction from point Lp. A signature comparison is performed at each of the 24 points in order proceeding from Lp, the results are stored, and the best match is found. It will be appreciated by the skilled artisan that the spiral pattern and the order of testing is convenient and not limiting for the invention, as other patterns and orders may well be used.

The unique testing and correcting mechanism in this embodiment is achieved through the use of an algorithm that computes the average root mean square difference of the RGB color values between the colors of the test pixels and the stored signature colors of the target pixels. That is, for each new assumed position, each default pixel position in the test pattern is taken from the video memory array along with R, G and B values. The exemplary root mean square method takes the square root of the sum of the squares of the delta, or deviations, of each pixel color magnitude at each position in the test pattern, sums over all of the pixel pattern, and divides by the number of pixels in the pattern. In this method the best match is determined by the lowest value for the calculation.

The algorithm executes each time a test is conducted for all of the involved test pixels or one time per frame interval, assuming that each iteration is successfully completed in the time of the single frame. If computing time is inadequate, a frame may be skipped. Factors affecting the number of text positions used in an iterative test pattern, such as the spiral position test, include frame speed CPU power, total Image screen-size, and so on.

It will be apparent to the skilled artisan that the least mean square method of comparison of color signatures is a convenience, and not a limitation to the invention. There are a variety of ways the color signatures at assumed image entity positions may be compared with the original image entity signature.

In the embodiment herein described all new and assumed positions for tracking box 29 are tested against the originally-stored image. In an alternative embodiment of the invention, at default intervals, the last best signature is assumed as a new base signature, based on the fact that an image entity, such as actor in a video, may move in a way that the image signature may change.

Figure 6:
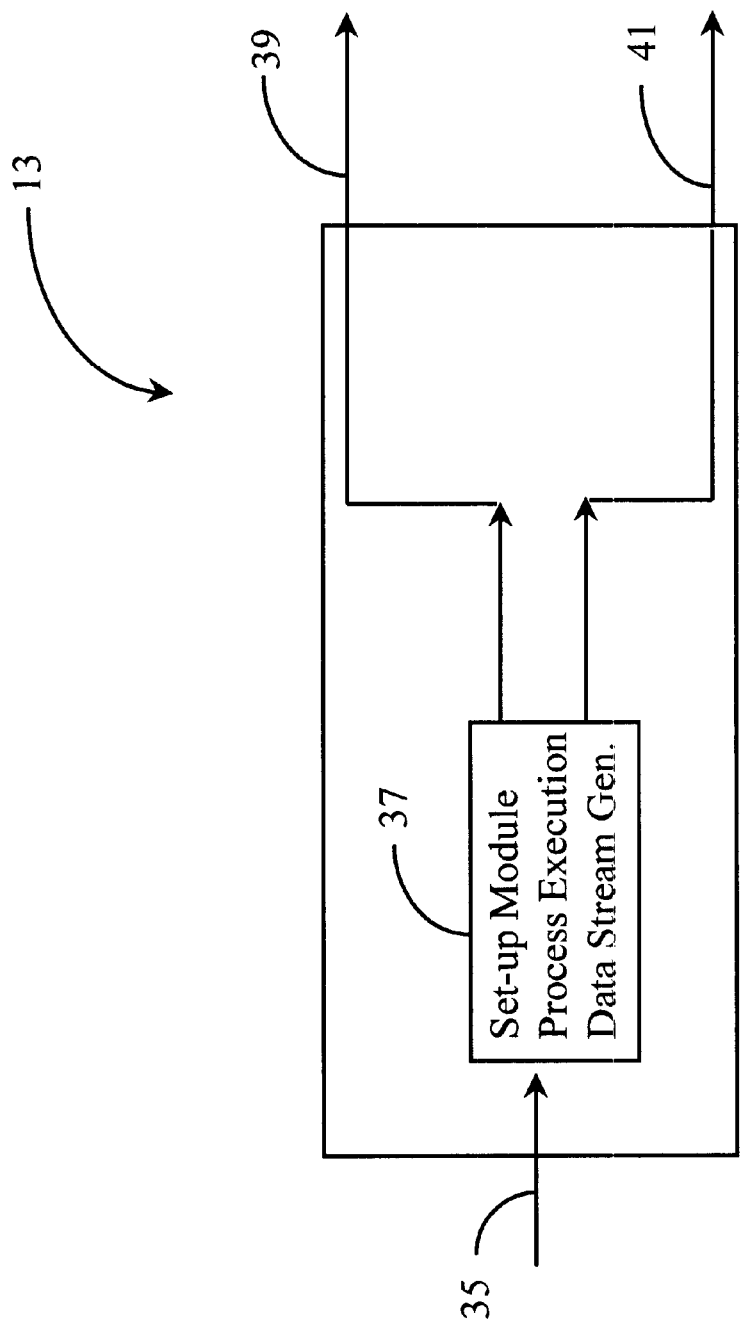
FIG. 6 is a block diagram illustrating a data-stream generator and set-up function of the tracking module of FIG. 1 according to an embodiment of the present invention.

FIG. 6 is a block diagram illustrating a data-stream pipeline and set-up function of the tracking module of FIG. 1 according to an embodiment of the present invention. During the tracking process as described above, a separate data stream is created, synchronous to the original video stream, that contains the coordinate data for the center position of tracking box 29 determined in each frame. As previously described with reference to FIG. 1, this output (combining both streams) is directed back to be viewed.

Tracking module 13 takes in the original video stream illustrated herein via a directional arrow (element 35) into a module 37 responsible for set-up, process execution and data-stream generation. Module 37 is capable of working in a ten-frame pipeline with 16, 24, and 32 bit resolutions. It is important to note here that the parameters of a ten-frame pipeline and 16, 24, and 32 bit resolution capability are exemplary of a preferred embodiment judged by the inventors through empirical method to be adequate for most instances. In other embodiments, other resolutions and frame capacities may be employed.

Set-up includes operations such as pre-selecting tracking box shape and size, pre-selecting number of target and test pixels, and so on. Process execution encompasses initiating and carrying out the automated tracking process including iterative execution of the test algorithm. A data-stream generator produces a data-stream with tracking coordinates for each frame interval which is synchronous to the frame intervals of video stream 35. Although the inventor has chosen to illustrate only one module 37 responsible for three basic functions, it will be apparent to one with skill in the art that three separate modules may be provided with each responsible for one dedicated function.

Two synchronized streams, video stream 39, and data stream 41, are output from tracking module 13. With respect to viewing the tracking process on a display such as screen 14 of FIG. 2, for example, it is desired that there is no visible wavering or other erratic movement of a tracking box such as box 29 of FIG. 2 as this would translate to the end user having an interactive icon or transparent shape that wavers identically when watching the video. Therefore, an additional smoothing module may be provided and executed at a time interval before 10 data-frames leave module 13. This module would use known algorithms to judge and correct x and y coordinate positions to obtain a smoother curve or arc over a 10 frame interval in cases wherein image motion is not in a straight line. The requirement of such a module is not needed to practice the present invention, but rather preferred for further refinement of the end product.

In the interactive system described above a first vector was determined by the spiral testing method described. In another embodiment, the editor who selects and places the tracking box on an entity to be tracked may also move the tracking box (drag) along the apparent path of the moving entity, which in this alternative embodiment creates a series of new positions for the tracking box equal to the number of frames over which the editor drags the tracking box. When the editor drops the box, the tracking engine takes over, using the last vector as an assumption for a new position, as described above, and the tracking continues automatically.

It will be apparent to one with skill in the art that those who advertise and promote products or services may utilize the capability as taught by the present invention to create a venue for the promotion of such products or services. For example, a subscriber (end user) to a service specializing in providing video media wherein interactive advertisements are presented may obtained CPE equipment adapted to display, identify, and provide, through interactive device, methods for obtaining additional information regarding image entities. Such interaction may be a simple mouse click on the entity during playback of the video which may invoke a link to a network-based data-server that may deliver the data to the end user via modem connection or the like.

In another embodiment, the method and apparatus taught herein may be used for interactive teaching purposes wherein a highlighted image entity may be clicked on a special display screen causing related information to appear in a second window or screen associated with a plurality of connected devices such as PC/VDU's used by students participating in the session.

It will be apparent to one with skill in the art that through later video editing techniques, a tracked image may have other created images associated with it such as semi-transparent shapes defining interactive regions, information blocks that follow the image, and so on.

Multi-Image Tracking System Architecture

According to a preferred embodiment of the present invention a unique authoring system architecture is provided which allows multiple authors to track separate images and add annotations including interactive icons, animated graphics, text, audio etc., to a single live or pre-recorded video feed. This is made possible via an innovative synchronous architecture wherein such authoring may be performed in near real-time such that delay of the broadcast video to an end user is negligible.

Figure 7:
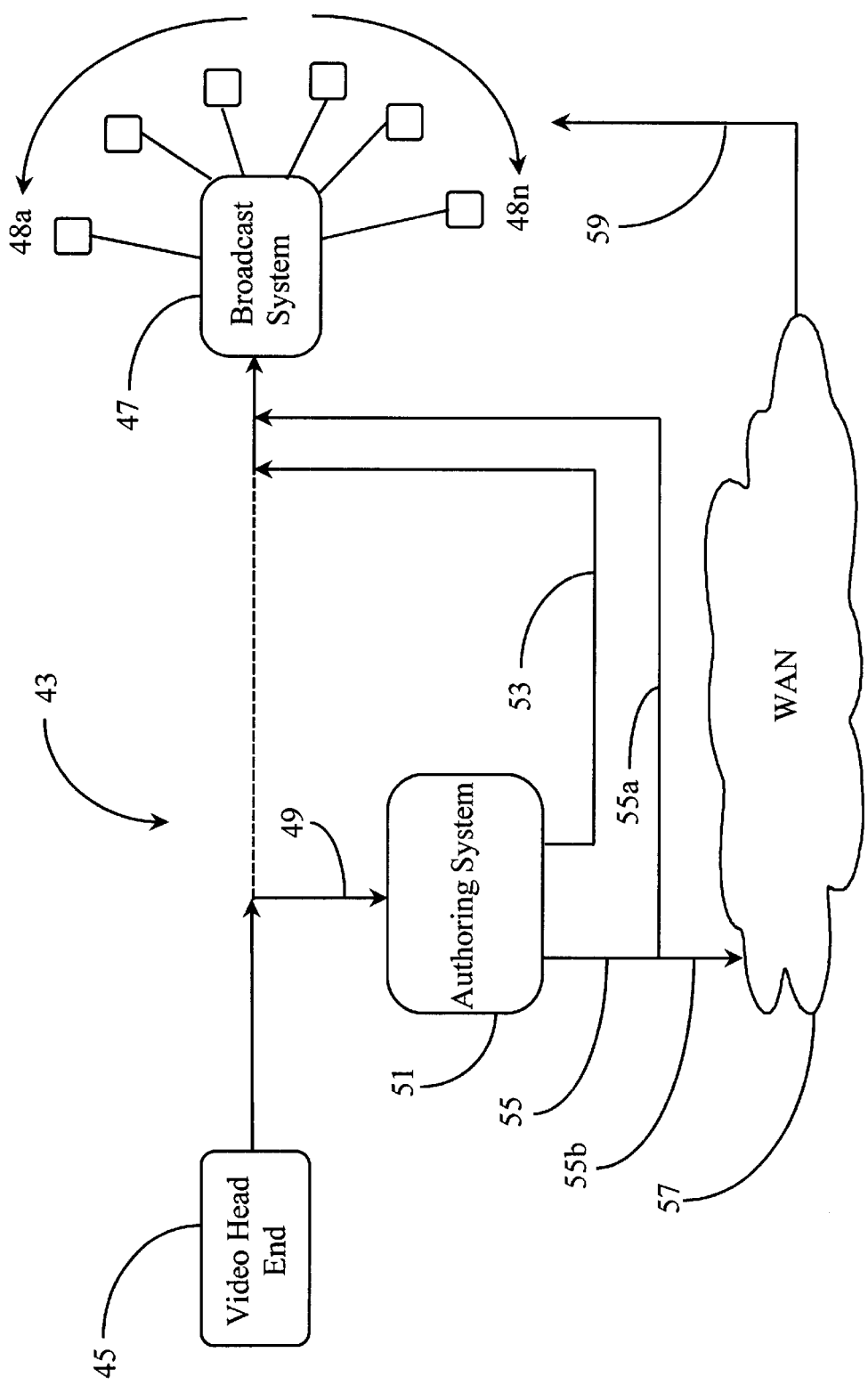
FIG. 7 is a block diagram illustrating a real-time video authoring and delivery system according to an embodiment of the present invention.

FIG. 7 is a block diagram illustrating a real-time video authoring and delivery system according to an embodiment of the present invention. A video capture and -delivery architecture 43 is provided and adapted to include the authoring system and architecture of the present invention. Some components of architecture 43 are known and currently practiced in the art. For example, architecture 43 comprises a video head end 45 which is the source of the video stream for the innovative architecture of the invention. Head end 45 may be from live video feed from a video camera at the scene of, for example, a live sporting event. In another embodiment, head end 45 may comprise a pre-recorded video feed that is re-broadcast to end users, however, for the purpose of the present invention, an example of a live video broadcast will be used extensively.

Also included in architecture 43 and known in the art is a broadcast system 47. Broadcast system 47 may be any type of system adapted to deliver live or pre-recorded video signals such as via cable TV, Internet delivery, satellite system, network broadcast, etc. Broadcast system 47 delivers the video feed to any number of end users such as are represented here via element numbers 48a–48n. End users 48a–n are shown logically connected to broadcast system 47 for associative purposes only with such logical connections representing typical avenues of media connection such as cable, satellite, and so on.

In a preferred embodiment of the present invention the live video stream from video head end 45 is diverted to a unique authoring system 51 from it's normal path to broadcast system 47, as illustrated via diversion path 49. Alternatively the video feed may just be tapped from its normal path to broadcast system and fed to the authoring system.

Authoring system 51 receives stream 49 for the purpose of authoring the stream as described above. Authoring system 51 comprises multiple dedicated authoring stations equipped with software capable of tracking images within the video stream and adding annotations including interactive icons, text, animated graphics and sounds, as is disclosed in enabling detail below. Due to a unique synchronous architecture which allows multiple image tracking and annotation operations to be performed simultaneously, the resulting output streams, shown here as stream 53 (video stream) and stream 55 (annotation stream) may ultimately reach end users such as users 48a–n via broadcast with minimal or no delay. However, instead of a diversion if the video stream is only tapped from the video head end 45 into the authoring system 51, the video stream 53 may not be used further and the video stream from the head end 45 is sent directly to the broadcast system 47. In some of the further discussion we may assume that the video is diverted and not just tapped from the video head end 45, but as mentioned above this may not always be the case.

With respect to output streams, the fact that there are two separate output streams (53 and 55) shown proceeding from authoring station 51 reflects just one embodiment in which the image tracking coordinates and annotations are contained in one annotation data stream (55) that is separate from stream 53 (video stream). However, it may be desirable to combine the streams before being delivered to broadcast system 47 (after authoring). If the video stream and the annotation data stream are sent separately then they have to be synchronized at the user's equipment so the video presentation may be viewed with the annotated material. One good reason for not combining the two streams immediately on authoring is that annotation stream 55 is not limited to being delivered via broadcast system 47. For example, element numbers 55a and 55b represent annotation stream 55 in states of being delivered to end users 48a–n via alternate or variable routes, such as by an Internet connection.

Stream 55a, in this example, is illustrated as being sent along with stream 53 to broadcast system 47 where the streams are combined before broadcasting. In case of an analog broadcast the annotation data stream (stream 53) may, for example, be sent using the Vertical Blanking Interval (VBI) and synchronized with the video. In case of a digital broadcast (using for example MPEG2 digital video format) this annotation stream may be sent as a private data stream multiplexed with the audio and video streams in the digital broadcast. Annotation stream 55b is alternatively illustrated as being delivered over a wide-area-network (WAN) 57, which may be the Internet or other type of WAN, directly to one, some or all of end users 48an via a path 59 which represents collective individual user WAN connections. Likewise, still other known delivery mediums may be used. In some special instances, streams 53 and 55 may be combined before leaving authoring system 51. There are many variable possibilities.

It will be apparent to one with skill in the art that there may be more than one type of broadcast system used in the broadcast of a single video event as shown in this example without departing from the spirit and scope of the present invention. For example, some of users 48a–n may receive streams 53 and 55a via cable, while others may receive the streams via satellite and so on. Similarly, some of users 48a–n may receive data streams through separate media of transport such as stream 53 via cable and stream 55b via Internet and so on. Any combination is plausible provided that the user has appropriate equipment and connections adapted for receiving and displaying the broadcast video and synchronously display the annotation data comprising of tracked entities, icons, text, sounds, animated graphics and the like. The scope of the present invention is not limited by the medium of transport used for transmitting the video and the annotation data stream.

Figure 8:
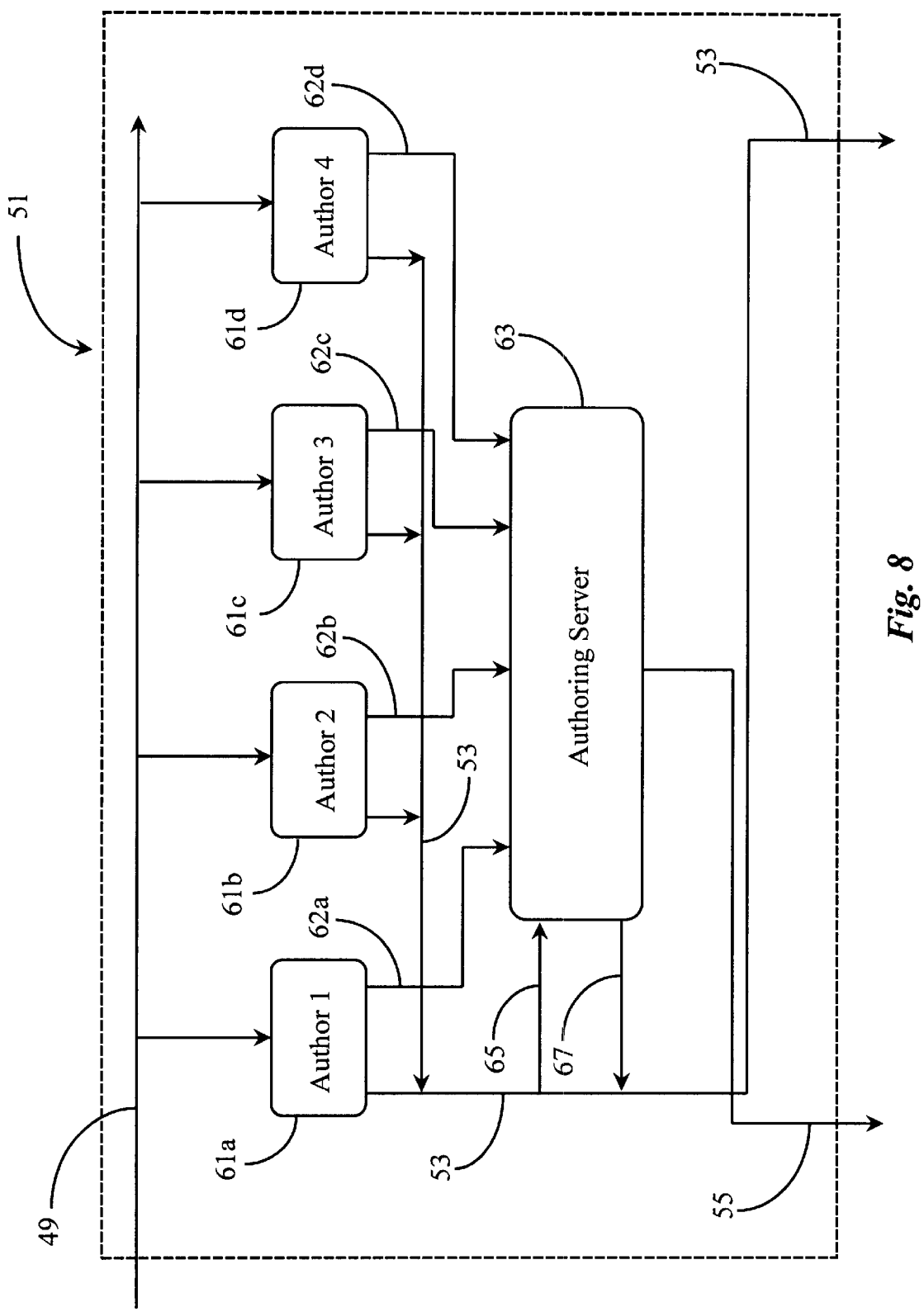
FIG. 8 is a block diagram illustrating multiple authoring station architecture according to an embodiment of the present invention.

FIG. 8 is a block diagram illustrating a multiple authoring station architecture for authoring system 51 according to an embodiment of the present invention. Authoring system 51 comprises a plurality of (in this case 4) authoring stations 61a–61d that are adapted for tracking image entities and providing additional annotation, including annotation regarding tracked entities. An authoring station such as station 61a is analogous to authoring station 11 of FIG. 1 except for added capability, according to embodiments of the present invention, for providing further annotation (other than tracking information) and interactive applications as previously described. More detail regarding such capability is provided below.

Video stream 49 from the video head end enters authoring system 51 and is simultaneously provided to each authoring station in the system, such as stations 61a–d (illustrated via branching arrows). It will be apparent to one with skill in the art that there may be more or fewer than four authoring stations used without departing from the spirit and scope of the present invention. For example, if only two entities are to be tracked, then only two stations may be required to be operational. If there are nine entities to be tracked, then nine stations may be required to be operational. Similarly, each authoring station may or may not be similarly equipped with respect to tracking and annotating. For example, if there are three entities to be tracked and some general annotation (not particularly associated with an image) to be performed, then stations 61a–c may be assigned to tracking and station 61d may be reserved for general annotation and so on.

After authoring is performed via stations 61a–d, as illustrated in this example, there are two streams that are output from each station. One is video stream 53 which in most embodiments will remain unchanged under most circumstances, except for any frame speed adjustments and normalization of video image such as was described with reference to FIG. 1. above depending on the requirements of the video delivery system. The other is an annotation data stream containing annotations such as are individual to each station where annotations are performed. For example, annotation streams 62a–62d are associated with stations 61a–61d respectively. Annotation streams 62a–d differ from each other only in that the annotations contained therein are different as a case of being authored in different stations.

Annotation streams 62a–d are generated so as to be synchronous with stream 53. Therefore, it is ideal that all output streams are running in synchronous mode while leaving each authoring station. Previously described conventions such as the ability of image tracking software to skip frames helps to assure this ideal.

An authoring server 63 is provided and adapted to combine annotation streams 61a–d into one annotation stream 55 which is analogous to stream 55 of FIG. 7. In this way, all annotations performed separately may be combined and may act in unison at the users end. Video stream outputs from the separate stations converge, or more specifically, remerge into video stream 53 as illustrated via a horizontal, left-facing arrow labeled element number 53. Video stream 53 is the normalized video output from each authoring station and typically does not include any annotations.

If there is a known latency with respect to recombining streams 62a–62d in server 63, then video stream 53 must be re-synchronized with annotation stream 55 before stream 55 becomes output. In this case, stream 53 is diverted over path 65 into server 63 and delayed until it is synchronous with stream 55 before it exits server 63 over path 67. In this way, streams 55 and 53 remain synchronous on output from the authoring system. In an alternate embodiment, synchronic delay may be performed in a separate server (not shown). The video stream that is output from system 51 (stream 53) remains essentially unchanged from the video that is input into the system (stream 49) unless the medium of transport of the video stream requires a different video resolution or frame rate. Although it has been previously described that a preferred arrangement for an authoring station such as authoring station 61a is a PC/VDU with a CPU running at least 266 MHz and a Windows platform, it will be apparent to one with skill in the art that other platforms may be used such as a Sun Microsystems workstation, UNIX operating systems, and so on. In the case of differing platforms, differences in functional software architecture will also be apparent.

It will also be apparent to one with skill in the art that video stream outputs which ultimately remerge as stream 53 may be transferred to server 63 and delayed for synchronous purposes and so on, without departing from the spirit and scope of the present invention. In the latter case, it is conceivable as well that if both streams 53 and 55 share entry into server 63, they may also be combined therein and output as one annotated video stream.

Figure 9:
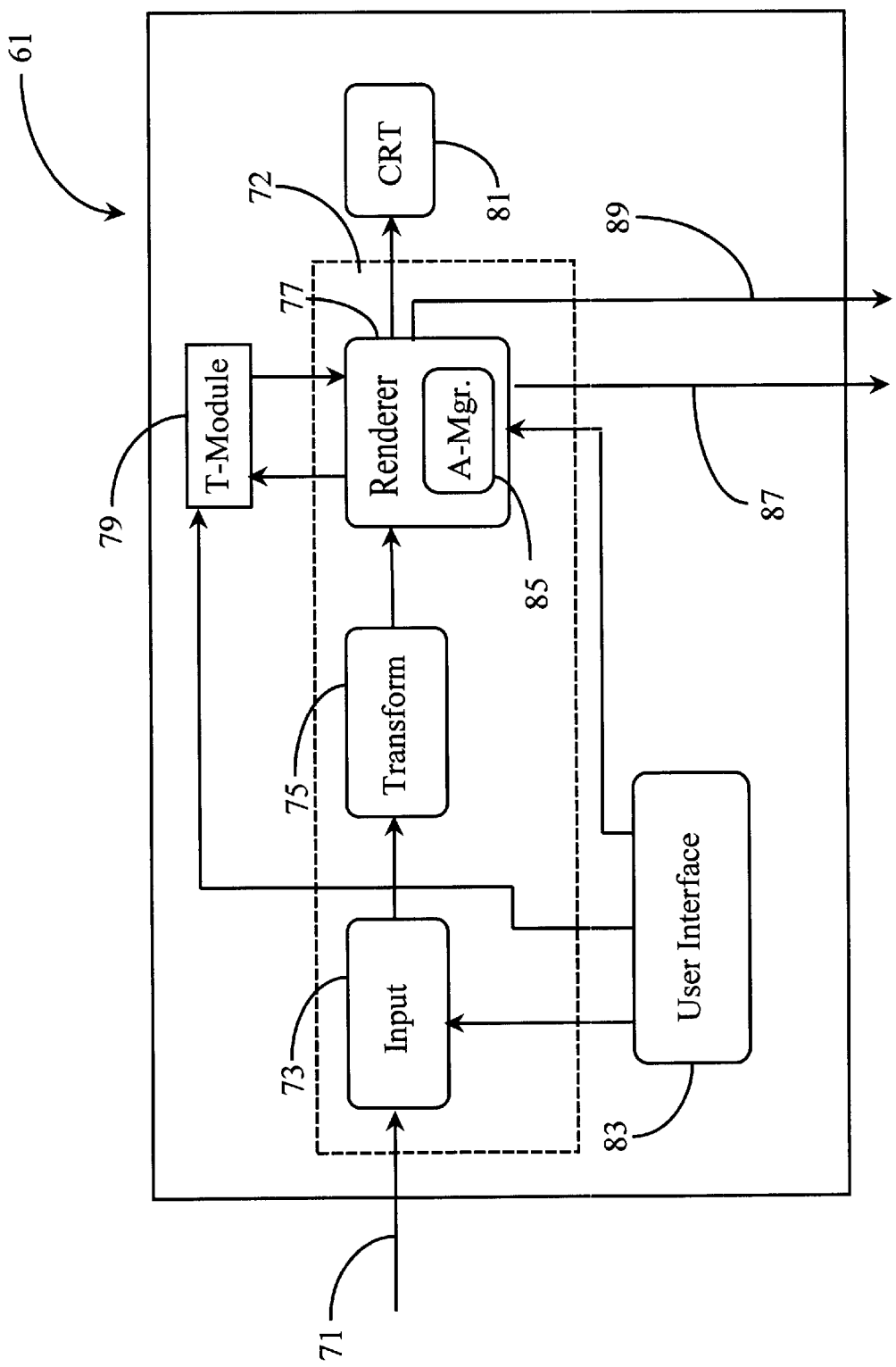
FIG. 9 is a block diagram illustrating an exemplary modular architecture of a single authoring station according to an embodiment of the present invention.

FIG. 9 is a block diagram illustrating an exemplary modular architecture of a single authoring station according to an embodiment of the present invention. Authoring station 61 is provided and adapted to track a moving image entity in a video presentation and to provide tracking coordinates as well as other types of annotation for the purpose of soliciting responses from an end user through interactive device. Authoring station 61 is, in this embodiment analogous to station 61a of FIG. 8. Authoring station 61 utilizes various interfacing software modules in performing it's stated functions as is further detailed below.

The exemplary architecture is just one architecture through which the present invention may be practiced. A CRT module 81 is provided and adapted to display a normalized graphical bitmap image-stream as may be viewed by a person involved in an authoring procedure. A Filtergraph 72 comprises three software filters that are dedicated to performing certain functions. These are input filter 73, transform filter 75, and renderer filter 77. These three filters are responsible for receiving input video from variable sources (input filter), interpreting presented data and forming an image (transform filter), and generating and displaying the actual viewable video stream (renderer filter) comprising of a series of bitmapped frames. Within the domain of filtergraph 72, video frame speed is set at 30 FPS (exemplary), and resolution is set at 352 by 240 pixels (exemplary). This provides a compatible set of parameters for authoring station 61 which is, in this example, a PC/VDU running Windows as previously described.

Input filter 73 is adapted to accept a video input stream 71 which may be sourced from a wide variety of either analog or digital feeds. Examples are live video feeds from satellite, video camera, cable, and prerecorded video feeds from a VCR, CD-ROM, DVD, Internet server, and so on. In addition to video input, filtergraph 72 may also accept input from a user interface module 83 adapted to provide certain controls relating to filter 73 such as video conversion controls, frame rate controls and so on. Control directionality with regards to user interface 83 is illustrated via directional arrows emanating from interface 83 and leading to other components. Such controls may be initiated via keyboard command or other known method such as via mouse click, etc. Transform filter 75 interprets data for the purpose of obtaining bitmap images at a normalized resolution. Renderer filter 77 then draws the bitmap image-stream on CRT monitor 81 for viewing. In another embodiment, CRT 81 may be another type of monitor wherein pixel graphics may be viewed such as are known in the art.

A tracking module 79 (T-module) is provided and adapted to track an image and provide frame by frame tracking coordinates and to be a vehicle through which additional annotations may be provided through user interface 83. For example, through interface 83, an author may set up the parameters for tracking such as are described with reference to FIG. 5 above, as well as add additional annotation such as static or moving image icons, formatted text, animated graphics, sounds and the like. Tracking module 79 is analogous to tracking module 13 of FIG. 1.

Renderer filter 77 is the driver that drives the video display as previously described. Tracking module 79 works in conjunction with renderer filter 77 as illustrated via opposite-facing arrows between the modules. That is, it is at this stage that image tracking and annotation operations actually take place as previously described. For example, the upward facing arrow emanating from renderer filter 77 and entering tracking module 79 represents input stream 71 (in the form of a series of bitmapped images ). The downward facing arrow emanating from module 79 and re-entering filter 77 represents output stream 71 and the additional information related to the positions of the entities being tracked. The video presentation is simultaneously being played on CRT 81 as tracking is occurring and is subsequently sent on as output stream 89 from renderer filter 77 which is analogous to video stream 53 of FIG. 8. An annotation manager 85 within renderer 77 converts annotation data, input during annotation processes and the data relating to the tracked entities output from the tracking module, to metadata for more compact transmission in output stream 87. Stream 87 is a data stream containing information about the various annotations added by the author and the tracking co-ordinates of the tracked entities and is analogous to the annotation stream 62b of FIG. 8. Such metadata conversion-data tables for compact transmission in output stream 87 may be stored elsewhere accessible to the CPU powering authoring station 61. User interface 83 provides considerable option and capability for entering commands to add image icons, animated graphics, following tracked objects or static or moving independently in the video in predefind manner, formatted text captions and so on.

In one embodiment, user interface 83 may pre-programmed by an author to supply the appropriate pre-selected annotations in a reactive fashion. That is, according to a specific time interval, a signal could initiate annotation inserts and so on. In other embodiments, an author may physically enter an annotation via pressing a pre-defined key on a keyboard and so on. There are many known methods for inserting annotations.

It will be apparent to one with skill in the art that other software module configurations may be used instead of those presented in this example without departing from the spirit and scope of the present invention. For example, similar functional modules may be provided to be compatible with alternate platforms such as UNIX or Macintosh.

It will also be apparent to one with skill in the art that the bulk of annotation in the form of inserted text, graphical icons, universal resource locators (URL's), interactive shapes, and so on will, in many embodiments, be at least partly associated with tracking coordinates of an image and therefore will depend on those frame by frame coordinates. For example, an interactive icon may follow a moving image entity and be visible by an end user as in case of advertisement logos for sponsors of sportspersons in a sporting event. Text blocks and the like may take similar association. Hence, the specific content of annotations and insertion methods of such annotations may be pre-designed based on known facts about the video stream such as what image is to be tracked for what advertiser who has what URL's and so on. Execution of those annotations may be automatic according to a timed function as described above, or may be performed manually, perhaps using a macro or other designed input function.

In another embodiment, added functionality could be added to user interface 83 which allows for an author to adequately identify an image entity to be tracked so as to be enabled to place a tracking box such as box 29 of FIG. 5 over the entity at a maximally opportune instant during image motion. In this case, once the tracking box in activated, the software could be adapted to allow the author to manually track the object till such a time that the tracking box is placed more or less at the center of the object in the video. A synchronization module could be added in authoring server 63 and adapted to synchronize separate annotation streams before combining them and synchronizing them with the output video stream which is stream 53 in our example.

System for Synchronizing Data Streams Delivered Over Separate Networks

According to a preferred embodiment of the present invention, unique synchronization systems are provided and adapted to overcome unpredictable latency inherent in delivery of data-streams that are delivered over separate delivery media to end users. Several methods and apparatus are provided and taught herein for this unique purpose. In one embodiment a video/data stream signature operation is executed after coordinate tracking and annotation operations are performed in an authoring station such as was described above with respect to authoring station 61 of FIG. 9. The signature streams are then sent to their respective broadcast and/or data-transmission systems to be sent to an end user. In this embodiment video/annotation stream capture and synchronization operations, executed largely via software on customer premises equipment (CPE), must be executed at the user's end before a single combined stream may be viewed by the user.

Figure 10:
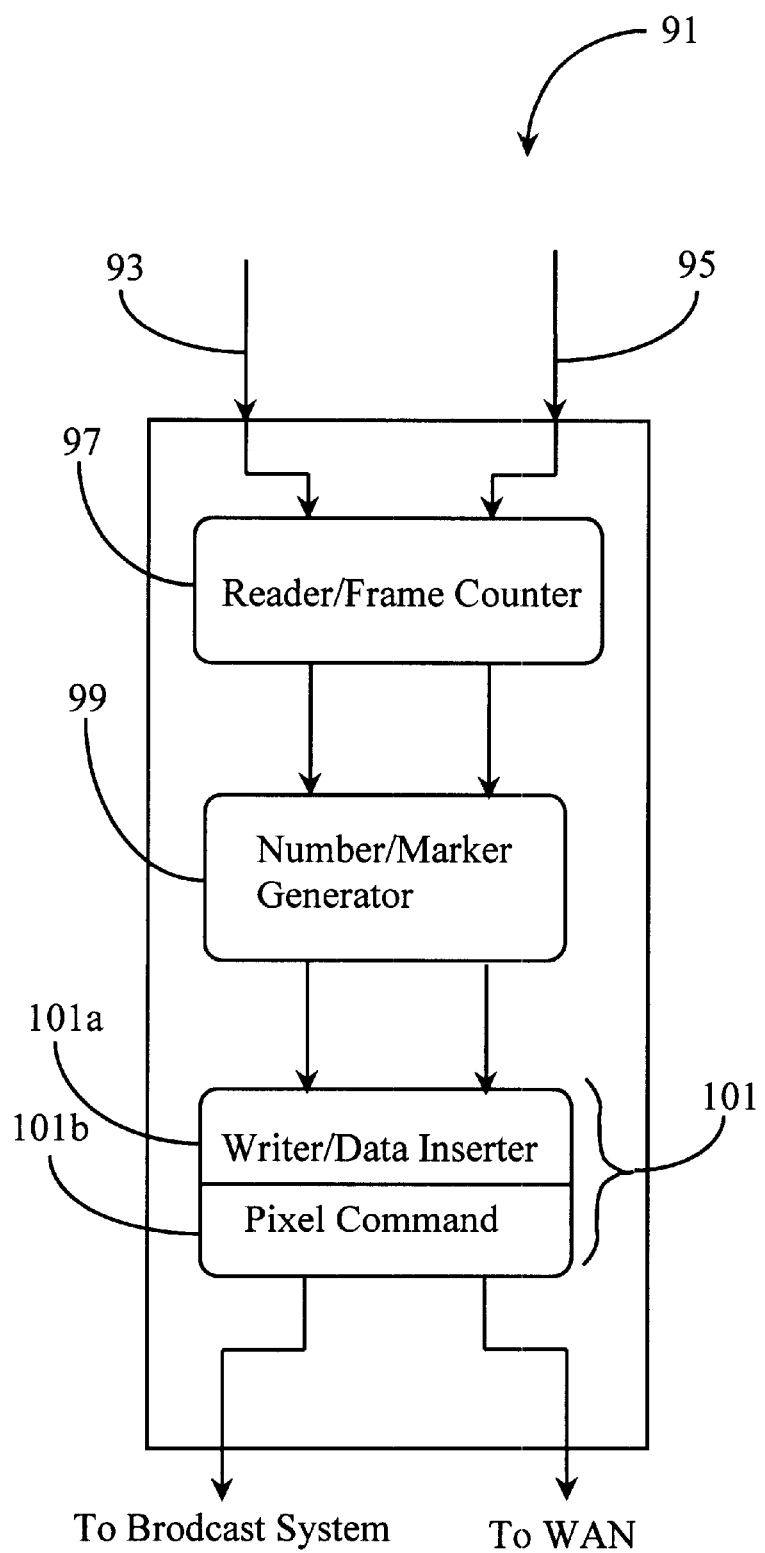
FIG. 10 is a block diagram illustrating a signature application apparatus at the authoring end according to an embodiment of the present invention.

FIG. 10 is a block diagram illustrating a signature application apparatus at the authoring end according to an embodiment of the present invention. A signature application module 91 is provided in this embodiment in the form of a software application module resident in an authoring server such as server 63 of FIG. 8. Module 91 is initiated in server 63 after tracking and annotation has been performed.

Separate data streams, in this example video and annotation, are given frame-specific identification and marking so that they may later be synchronized by using inserted data corresponding to the frame-specific identification.

A video stream 93 is shown entering signature module 91. Video stream 91 is analogous to stream 53 of FIG. 8. An annotation stream 95 is similarly illustrated as entering signature module 91. Annotation stream 95 is analogous to stream 55 of FIG. 8. Streams 95 and 93 are synchronous as they enter module 91. Synchronization has been achieved after image tracking and authoring in authoring server 63 of FIG. 8, as described in detail above. Synchronization after separate broadcasting is much more complicated and is described in enabling detail below.

Referring back to FIG. 10, in this embodiment, a frame reader/counter module 97 is adapted to read video stream 93 and annotation stream 95 for the purpose of recording an association of annotation data to video-frame data using a serial count of each frame. Because annotation stream 55 of FIG. 8 was generated at the time of tracking an entity within video stream 53 of FIG. 8, each stream comprises a same number of frames constituting an entire stream length. Therefore, it is possible to count and associate individual frames in serial fashion. A number/time marker-generator module 99 generates code to represent frames in annotation stream 95 and also to represent time markers in video stream 93. Further binary numbers are generated for use in a pixel signature method described more fully below.

According to a preferred embodiment of the present invention, several separate signature methods, all primarily for analog video, but also applicable to digital video, are used. In some embodiments more than one method is used, to insure that synchronization information survives to the customer's equipment end. All methods share a common goal, which is to provide a means for two separately transmitted data streams to be later synchronized. In one mode, at regular intervals, a marker is inserted in one of the data streams, and information denoting which frame from the other of the two data streams should be displayed at the marker for the two streams to be properly synchronized is provided in the data stream with the markers.

In one of the several methods a number denoting frames in one of the two data streams is inserted into video blanking intervals (VBIs) of the other data stream. Typically the synchronizing number needs be inserted only once in several frames, and the fact of such a number appearing in a VBI can serve also as a marker; that is, the appearance of the number in a VBI can be taken to mean that the associated frame from the companion stream is to be displayed with the "next" frame in the carrying stream. The convention could also be applied to any frame following the "next" frame.

In a second method the identifying number is inserted in one or another of the horizontal blanking intervals (HBI) of a frame in the carrying stream. The particular HBI is known by convention, and more than one HBI may be used as a "belt-and-suspenders" approach. In this method the marker may be also by convention, such as the "next" frame, or some number of frames following the "next" frame.

A third method for synchronization signature according to an embodiment of the present invention involves altering pixel data in a manner to communicate a binary number to a system (described further below) at the user's end programmed to decode such a number from a carrying data stream. In this method, in the carrying data stream, the data stream values for an "agreed-upon" pixel are altered. For example, for one particular pixel in a frame, the R,G, and B values (or, in appropriate instances, the Y, U, and V values) may be arbitrarily set to zero to denote a zero bit in a binary signature, and in following frames the values for the same pixel may be set to maximum value (all 1's) to denote a binary 1 bit for the signature. In this manner, over several frames, a binary number denoting a particular frame from the companion data stream may be inserted.

In this pixel alteration method, a marker is also needed. Again, the marker can be by convention (preferred), such as the third frame after the end of a decoded signature, or the same sort of coding may be used to insert a binary marker signature.

In the pixel insertion method, any pixel may be used by convention, but some may serve better than others. For example, in some instances jitter problems may make pixel identification relatively difficult. In a preferred embodiment, wherein a logo is used to identify a data stream, such as a network logo seen in the lower right of frames for some networks, a particular pixel in the logo may be used, which would serve to alleviate the jitter problem.

It will be apparent to the skilled artisan, giving the above teaching, that there will be a variety of ways pixel data may be altered providing a coding system for a synchronization signature. For example, the R, G, and B values may be altered differently by convention, providing three signature bits per pixel, and more than one pixel may be used; so a coded number of virtually any binary length may be provided with the data for a single frame in a video data stream.

Instead of altering the pixel signature in a frame at specific intervals, the pixel signature in frames at regular intervals could be read from the video and transmitted in the annotation data stream and these signatures from the video stream and the annotation data stream could be matched at the receiving end to obtain synchronization.

In combination with methods described above, time may be used in addition to frame numbers and the like for synchronization with the control stream. Time may also be used without resort to the information insertion and markers described above. For example, time stamps may be put at intervals in the data streams to be synchronized, and the time stamps can be associated with any clock apparatus input at the user's end to synchronize the streams. Alternatively, a time stamp may be included at the beginning of each stream, and the frame rate may be used in an algorithm to determine synchronization of the data streams. In some instances it may be necessary for the servers and the user's equipment to be synchronized in time; that is, the clock at the server end needs to be checked with, and corresponded to the clock at the user's end.

In yet another method for synchronization a pixel signature, such as a scene thumbnail, from one data stream, inserted in the other data stream, may also be used for synchronization purposes. The pixel signatures can be compared at the user's end.

In yet another method, if the video is in a digital format, such as Motion Picture Expert's Group (MPEG), SMPTE-like time stamps may be inserted into the headers in the data packets which are then compared with time stamps in the control stream.

In a preferred embodiment of the present invention, more than one, or several, of the synchronization schemes described above (and further taught below) may be used in any instance. The reason for this is because it is possible that other systems downstream (toward broadcast, or in some rebroadcast) may use VBI's and HBI's to bear certain data, thus overwriting some or all data that may be inserted in blanking intervals via methods of the present invention, and other changes may be made. Similarly, a logo or other graphical alteration such as for a commercial may be inserted into a video stream thus overriding a planned pixel alteration in a significant section of the video. By using more than one method at the authoring end survival of the synchronization information at the user's end is assured.

Referring back to FIG. 10, a frame writer and pixel command module 101, comprising sub-modules 101a, and 101b, uses previously generated data to insert time markers and binary numbers into frame data of at least one of the data streams (93 and 95), as well as causing alteration to one or more pixels over a series of frames to create a serial transmission or physical marker that may be associated with frame numbers assigned to matching frames within annotation stream 95.

It will be apparent to the skilled artisan that either data stream may be the carrying stream. As a convention the primary video data stream may be used as the carrying stream rather than the annotation stream.

In some embodiments, a natural scene change convention may be used for markers. For example, known software may be provided and adapted to detect scene changes wherein a majority of pixel values show significant alteration. These scene changes will happen randomly throughout the video and typically are spaced over a number of frames.

It will be apparent to one with skill in the art that module 91 may be programmed according to pre-determined criteria without departing from the spirit and scope of the present invention. Such criteria may vary according to factors such as density of annotation data in a particular annotation stream, normal frame rate of the video, whether or not it is known if there will be any further annotation before broadcasting, and so on. For example, a timing marker may be taken every 5th frame instead of every 10th frame. Scene-change marking may or may not be used. There are many variables that may be considered before applying the innovative signature methods of the present invention. Presenting the combined signatures insures that re-synchronization remains possible at the user's end as previously described.

Figure 11:
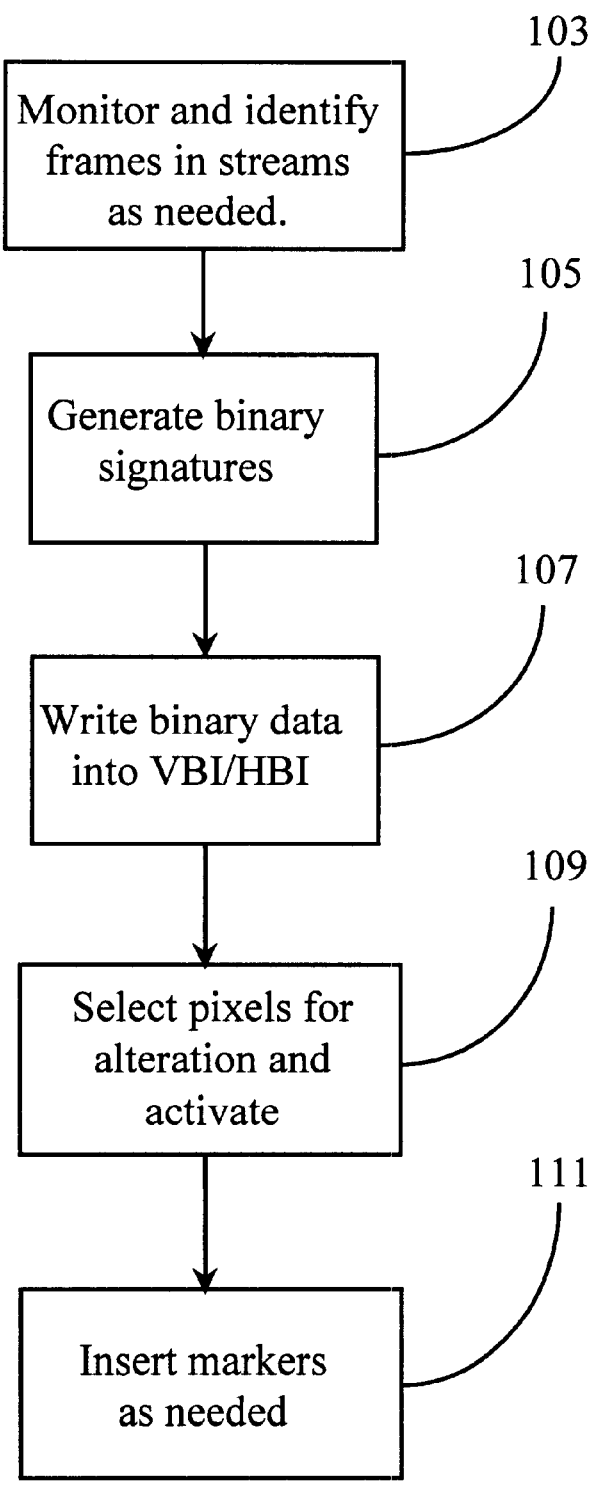
FIG. 11 is a process flow chart illustrating logical steps of providing a signature at the authoring end according to an embodiment of the present invention.

FIG. 11 is a process flow chart illustrating logical steps for providing a synchronization signature at the authoring end according to an embodiment of the present invention. At step 103 the frames of the two streams are identified and monitored as necessary. The software may determine, for example, the scope (density) of annotation, the status of available VBI and HBI areas, the frequency of frames for time marking intervals, and so on. This step also includes counting frames for the purpose of generating annotation frame numbers for signature association purposes. In step 105, serial binary numbers are generated in separate sequences that may be used for time marking, physical marking, and frame association.

In step 107, annotation frame numbers are written into VBI and HBI areas associated with video frames as well as to the appropriate annotation frame headers. If a concerted pixel alteration method is predetermined to be used as a marking scheme, then the pixel or pixels are selected, altered, and activated in step 109.

It will be apparent to one with skill in the art of video editing including knowledge of video-frame structure and the techniques for writing data into such video frames that there are many variations possible with regards to time marking and assigning identifying numbers to data frames wherein such numbers are also added to video frames. For example, differing frame intervals may be chosen as time markers, different bit structures may be used such as 16, 24, or 32 bit resolutions, and so on.

With reference to the stated objective of the present invention as previously described above, it was mentioned that the method of the present invention involves a second phase wherein separate data streams, marked via the conventions above, arrive at a user location after being sent via alternate mediums, such as one via cable broadcast, and one via a wide area network (WAN) delivery wherein, after receiving the streams, the user's equipment captures, re-synchronizes and combines the streams to be displayed for viewing as one annotated video stream. Such a CPE apparatus and method is provided and taught below.

Figure 12:
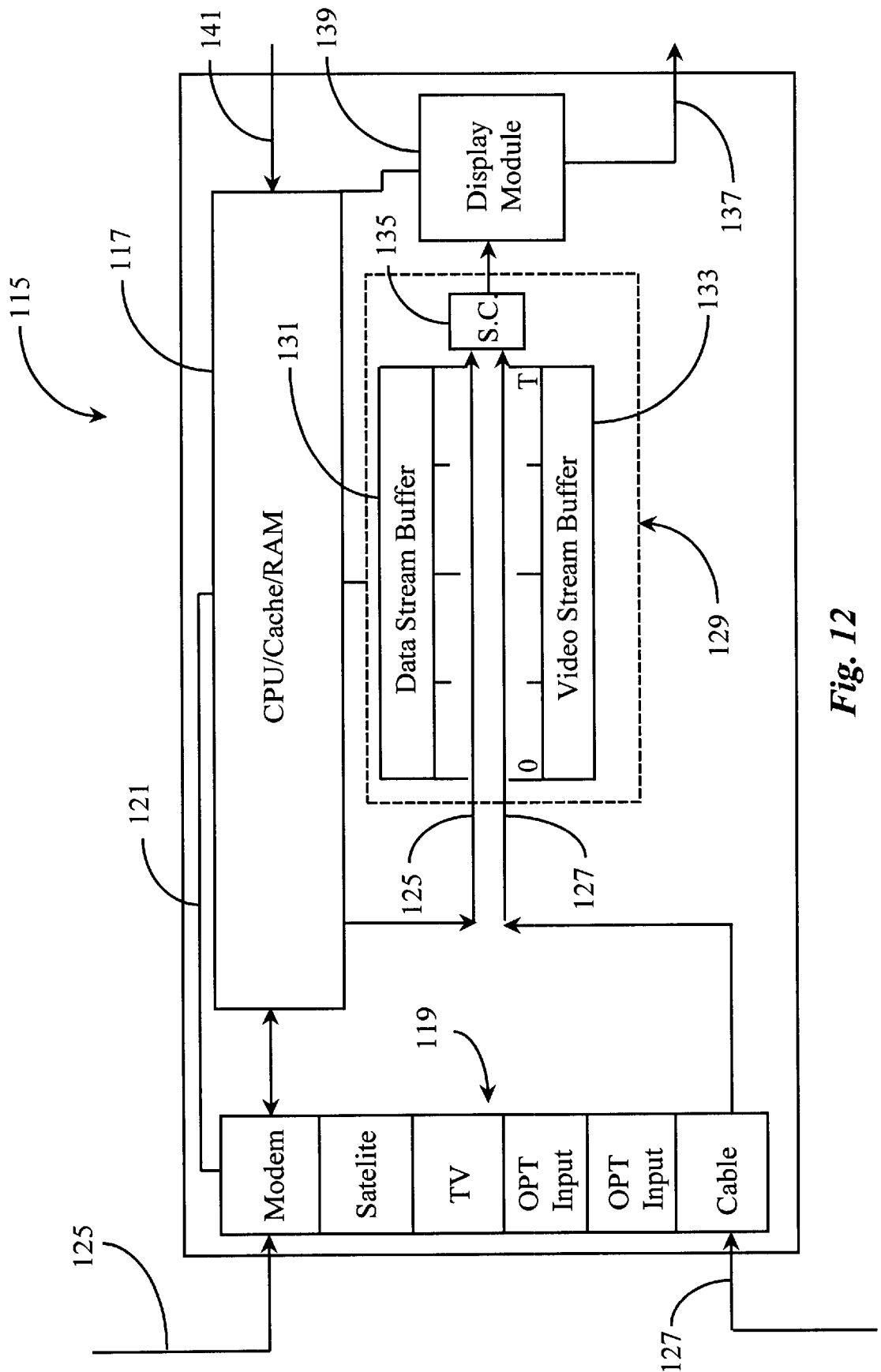
FIG. 12 is a block diagram illustrating a data capture and synchronization device at the user's end according to an embodiment of the present invention.

FIG. 12 is a block diagram illustrating a data capture and synchronization system at the user's end according to an embodiment of the present invention. System 115 is provided and adapted to receive broadcast data-streams from varying sources and combine and synchronize the streams so the data from the two different streams may be integrally displayed as authored. System 115 has a central processing unit (CPU) 117 that has a cache memory and random access memory (RAM). System 115 may be integrated with a computer or components thereof, a WEB TV or components thereof, or another type of receiving station capable of capturing and displaying broadcast video.

System 115 further comprises a signal receiving module 119, illustrated as connected to CPU 117 via bus structure 121. Bus structure 121 is the assumed connection to other illustrated modules within device 115 although an element number does not accompany the additional connections. Module 119 is shown divided into sub-modules with each sub-module dedicated to capturing signals from a specific type of medium. In this case, there are six sub-modules that are labeled according to medium type. From top to bottom they are a modem, a satellite receiver, a TV receiver, a first optional input port (for plugging in a peripheral device), a second optional input port (for plugging in a peripheral device), and a cable receiver. The optional input ports may accept input from Video Cameras, DVD's, VCR's, and the like.

In this particular example, an annotation data stream 125 is illustrated as entering system 115 through a modem, as might be the case if an annotation data stream is sent to an end user via the Internet or other WAN. A video broadcast stream 127 is illustrated as entering system 115 through the sub-module comprising a cable receiver. Streams 125 and 127 are analogous to streams 95 and 93, respectively, as output from signature application module 91 of FIG. 10. Video stream 127 in this example is a live broadcast stream in digital form. Annotation stream 125 is delivered via a WAN which in a preferred embodiment will be the Internet. As such, stream 125 arrives as data packets which must be sorted, as is well-known in the art.

System 115 further comprises a pipeline module 129 adapted to accept both streams 125 and 127 for the purpose of synchronization. Pipeline 129 is illustrated as having a time-begin mark of 0 and a time-end mark of T. The span of time allowed for buffering purposes may be almost any increment of time within reason. The inventors have has determined that a few seconds is adequate in most instances.

Video stream 127 flows trough pipeline 129 via a controllable buffer 133. Similarly annotation data stream 125 flows through pipeline 129 via controllable buffer 131. It is important to note here that either stream may arrive first to pipeline 129 and that neither stream has a predictable latency. The only constant factor between the two streams at this entry point are that they are both running at the same frame rate.

Innovative software is provided and adapted to read the time-marker and data-frame numbers in the carrying stream and to compare the indicated frame number for the opposite stream to the actual frame position relative to the carrying stream in the pipeline. The system is adapted to adjust either data stream toward synchronization of the two streams. For example, CPU, through executing the software, may repeat frames in a pattern in either data stream to slow that stream relative to the opposite stream. The software in a preferred embodiment performs this calculation for every detected time marker in stream 127.

Buffering alteration parameters will depend upon the frequency of time markers and the extent of error detected in timing between the two data streams. For example, it is desired to produce what is termed in the art to be a soft ramp effect so that sudden movement or jumping of annotations related to video entities as viewed by a user does not noticeably occur. Similarly, latency factors are unpredictable regarding both streams during the entirety of their transmissions. Therefore, buffers 131 and 133 are utilized continually to synchronize streams 127 and 125 as they pass through pipeline 129. Synchronization error toward the end of pipeline 129 is small enough so that the signals may be combined via a signal combining module 135 before they are sent on as one stream into typically a video RAM of a display module 139.

A single annotated video-stream 137 is output from display module 139 to a suitable connected display monitor or screen. An input signal 141 represents user interaction with an entity in video stream 137 as it is displayed. Such a signal may trigger downloading of additional detailed information regarding the subject of interaction. Interaction signal 141 results from a mouse click or other input command such as may be initiated via a connected keyboard or a remote pointing device or the like.

It will be apparent to one with skill in the art that the architecture illustrated herein is but one example of a data stream capture and synchronization system or device that may be integrated with other equipment without departing from the spirit and scope of the present invention. In one embodiment, system 115 may be part of a computer station. In another embodiment, system 115 may be part of a set-top box used in conjunction with a TV. There are various possibilities. Moreover, there may be differing modular components installed in system 115. For example, instead of providing a dial-up modem, WAN connection may be via satellite and the modem may be wireless.

In one embodiment, a broadcast video stream without audio narration may be synchronized to a separately received audio stream. Furthermore, a prerecorded and authored video feed from a source connected to an optional input module may be synchronized with a previously stored and annotated data stream from a source connected to a second optional input module as long as the signature process was applied to both streams according to the embodiment of FIG. 10. Interaction with tracked entities and the like associated with the prerecorded streams may be sent to a participating Internet server or the like through the modem sub-module provided the system is on-line during viewing.

Figure 13:
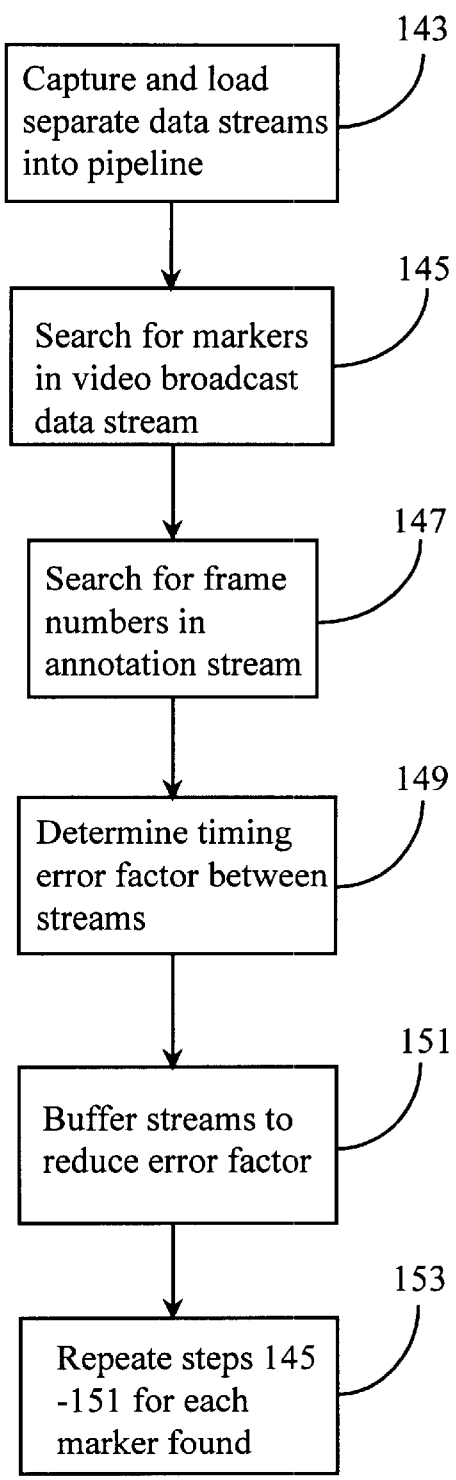
FIG. 13 is a Process flow chart illustrating logical steps for capturing and synchronizing separate video streams for user display and interaction according to an embodiment of the present invention.

FIG. 13 is a Process flow chat illustrating logical steps for capturing and synchronizing separate video streams for user display and interaction according to an embodiment of the present invention. In step 143, separate data streams are captured and redirected into a synchronization pipeline such as pipeline 129 of FIG. 12. Time markers, and if applicable, screen-change markers are searched for and detected in step 145. In step 147, data-frame ID numbers are searched and compared to data-frame numbers inserted in marker frames of a video stream such as stream 127 of FIG. 12. The data may be inserted in VBI and HBI areas or as coded numbers added previously by pixel manipulation.

In step 149, a timing error is calculated with regards to data inserted in a marker frame in the video stream as matched to data in an annotation data-frame closest to the marker. The error will define an annotation frame as being n number of frame intervals ahead of or behind the target marker frame. In step 151, the stream determined to be running n number of frames ahead is buffered to reduce the error. In step 153, the process repeats (steps 145–151) for each successive marker in the video stream.

The process steps illustrated in this embodiment are intended to be exemplary only. The order and function of such process steps may vary according to differing embodiments. For example, in some embodiments wherein it may be known that no further annotation will be performed after signature operations, then only time marker intervals with VBI inserted data may be used. In another such instance, it may be determined that only scene change marking and HBI inserted data will be used, and so on.

In a preferred embodiment, the method and apparatus of the present invention is intended for a user or users that will receive the video data via broadcast, and the annotation data via a WAN, preferably the Internet. This is so that additional data obtained by a user through interaction with a tracked entity in the video may be personalized and specific to the user. In a case such as this a user would, perhaps, obtain a subscription to the service. In other embodiments, other broadcast and data delivery methods may be used.

It should further be apparent to one with skill in the art that the method and apparatus of the present invention may be practiced on a wide variety of powered computer platforms utilizing a similar variety of viewing software, editing software, and module configuration without departing from the spirit and scope of the present invention. Therefore, the present invention should be afforded the broadest scope and not be limited to the exemplary embodiments as taught herein. The present invention is limited only by the claims that follow.

What is claimed is:

1. A system for synchronizing a first data stream with a second data stream, comprising:
    a first controllable dynamic buffer reading the first data stream for inserted frame identifiers identifying frames from the second data stream to be displayed with frames from the first data stream to accomplish synchronization;
    a second controllable dynamic buffer reading frame identifiers in the second data stream; and
    a control module controlling the dynamic buffers, adjusting the relative position of the two dynamic steams to accomplish synchronization according to the data read from the two data streams;
    wherein the frame identifiers read from the first data stream identifying frames from the second data steam are binary numbers decoded from pixel data in one or more frames in the first data stream.

2. The system of claim 1 wherein the frame identifiers read from the first data stream identifying frames from the second data stream are binary numbers read from vertical blanking intervals (VBI) in the first data stream.

3. The system of claim 1 wherein the frame identifiers read from the first data stream identifying frames from the second data stream are binary numbers read from horizontal blanking intervals (HBI) in the first data stream.

4. The system of claim 1 wherein the timing markers associated with the frame data are read from the first data stream, and wherein the control module utilizes the timing markers in adjusting the relative positions of the data stream.

5. The system of claim 1 wherein the control module adjusts relative position of the data streams by delaying one or the other of the data streams by introducing an initial startup delay to fill the dynamic buffers.

6. The system of claim 1 wherein adjustment is made gradually toward synchronization each time an adjustment is made.

7. A method for synchronizing a first data stream with a second data steam, comprising steps of:
    (a) reading the first data stream in a first controllable dynamic buffer for inserted frame identifiers identifying frames from the second data stream to be displayed with frames from the first data steam to accomplish synchronization, wherein the frame identifiers read from the first data stream identifying frames from the second data stream are binary numbers decoded from pixel data in one or more frames in the first data stream;
    (b) reading frame identifiers from the second data stream in a second controllable dynamic buffer; and
    (c) controlling the dynamic buffers by a control module, adjusting the relative position of the two dynamic streams to accomplish synchronization according to the data read from the two data streams.

8. The method of claim 7 wherein, in step (a), the frame identifiers read from the first data stream identifying frames from the second data stream are binary numbers read from vertical blanking intervals (VBI) in the first data stream.

9. The method of claim 7 wherein, in step (a), the frame identifiers read from the first data stream identifying frames from the second data stream are binary numbers read from horizontal blanking intervals (HBI) in the first data stream.

10. The method of claim 7 wherein, in step (a), timing markers associated with the frame data are read from the first data stream, and wherein the control module utilizes the timing markers in adjusting the relative positions of the data streams.

11. The method of claim 7 wherein, in step (c), the control module adjusts relative position of the data streams by delaying one or the other of the data streams by using the data in the dynamic buffers.

12. The system of claim 7 wherein, in step (c), adjustment is made gradually toward synchronization each time an adjustment is made.

* * * * *